US008023076B2

(12) United States Patent
Yoon

(10) Patent No.: US 8,023,076 B2
(45) Date of Patent: Sep. 20, 2011

(54) TRANSFLECTIVE LIQUID CRYSTAL AND MANUFACTURING METHOD THEREOF

(75) Inventor: Joo-Sun Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 470 days.

(21) Appl. No.: 11/933,284

(22) Filed: Oct. 31, 2007

(65) Prior Publication Data

US 2008/0180614 A1 Jul. 31, 2008

(30) Foreign Application Priority Data

Jan. 26, 2007 (KR) .................. 10-2007-0008517

(51) Int. Cl.
 *G02F 1/1335* (2006.01)
(52) U.S. Cl. ...................................... 349/114
(58) Field of Classification Search .................. None
 See application file for complete search history.

(56) References Cited

U.S. PATENT DOCUMENTS

| 5,920,084 | A | * | 7/1999 | Gu et al. ................ 257/59 |
| 6,452,654 | B2 | * | 9/2002 | Kubo et al. ............. 349/114 |
| 6,885,418 | B2 | | 4/2005 | Matsushita et al. |
| 7,123,327 | B2 | | 10/2006 | Otake |
| 7,561,231 | B2 | * | 7/2009 | Kanbe et al. ............ 349/113 |
| 2003/0048401 | A1 | * | 3/2003 | Hanaoka et al. ......... 349/123 |
| 2003/0122998 | A1 | | 7/2003 | Lijima et al. |
| 2004/0095530 | A1 | | 5/2004 | Itoh et al. |
| 2004/0150766 | A1 | | 8/2004 | Choo et al. |
| 2004/0239846 | A1 | | 12/2004 | Wen et al. |
| 2005/0018114 | A1 | | 1/2005 | Park et al. |
| 2006/0279678 | A1 | | 12/2006 | Kim et al. |

FOREIGN PATENT DOCUMENTS

| CN | 1495481 A | 5/2004 |
| CN | 1573480 A | 2/2005 |
| CN | 1617030 A | 5/2005 |
| JP | 2004-069827 | 3/2004 |
| JP | 2005-091722 | 4/2005 |
| JP | 2005-107513 | 4/2005 |
| JP | 2005-148619 | 6/2005 |
| JP | 2005-215668 | 8/2005 |
| JP | 2005-266761 | 9/2005 |
| JP | 2006-048071 | 2/2006 |
| JP | 2006-220923 | 8/2006 |
| KR | 2004-0026039 | 3/2004 |
| KR | 2004-0106634 | 12/2004 |
| KR | 2005-0011122 | 1/2005 |
| KR | 2005-0028837 | 3/2005 |
| KR | 2005-0068857 | 7/2005 |
| KR | 20060007151 | 1/2006 |
| KR | 2004-0091561 | 10/2007 |

\* cited by examiner

*Primary Examiner* — Lucy P Chien
(74) *Attorney, Agent, or Firm* — Innovation Counsel LLP

(57) ABSTRACT

The liquid crystal display includes a first substrate, a plurality of pixel electrodes formed on the first substrate and including a plurality of transparent electrodes and a plurality of reflective electrodes formed on portions of the transparent electrodes, a second substrate facing the first substrate, a liquid crystal layer interposed between the first substrate and the second substrate, and a plurality of organic insulator patterns formed in regions corresponding to the reflective electrodes. The planar shape of the organic insulator patterns for adjusting cell gaps of the liquid crystal display in the transmissive regions and the reflective regions may be adjusted such that the liquid crystals formed using drop injection may be dispersed rapidly and a uniformly to maintain uniform cell gap and prevent staining of the display.

20 Claims, 24 Drawing Sheets

TRANSFLECTIVE LIQUID CRYSTAL AND MANUFACTURING METHOD THEREOF

CROSS-REFERENCE TO RELATED APPLICATION

This application claims priority to and the benefit of Korean Patent Application No. 10-2007-0008517 filed in the Korean Intellectual Property Office on Jan. 26, 2007, the entire contents of which are incorporated herein by reference.

BACKGROUND OF THE INVENTION

1. Field of the Invention

The present invention relates to a transflective liquid crystal display and a manufacturing method therefor.

2. Description of the Related Art

A liquid crystal display includes a liquid crystal (LC) layer interposed between two panels that are provided with field-generating electrodes. The LCD displays images by applying voltages to the field-generating electrodes to generate an electric field in the LC layer that determines orientations of LC molecules in the LC layer to adjust polarization of incident light. The light having adjusted polarization is either intercepted or allowed to pass by a polarizing film, thereby displaying images.

The liquid crystal displays are categorized as non-emissive displays, and in that respect, they do not produce any form of light. Accordingly, the LCDs utilize artificial light emitted from lamps of a backlight unit separately provided, or ambient light, as a light source. Depending on the light sources employed by the LCD, LCDs are classified as a transmissive LCD or a reflective LCD. The light source of the transmissive LCD is a backlight, and the light source of the reflective LCD is external light. The reflective type of LCD is usually applied to a small or mid-size display device. A transflective LCD has been under development. The transflective LCD uses both a backlight and external light as light sources depending on circumstances, and are usually applied to small or mid-size display devices.

The transflective LCD includes a transmissive region and a reflective region in each pixel. In the transmissive region, internal light emitted from the rear of the LCD passes through the liquid crystal layer toward front of the LCD to display images, while exterior light supplied through the front of the LCD successively passes through the LC layer and is then reflected by the reflective electrodes, and again passes through the LC layer to display images in the reflective region.

While light passes through an LC layer only once in the transmissive region, light passes through the LC layer twice in the reflective region. Due to these characteristics, difference of color tone between the transmissive region and the reflective region may occur.

To solve this problem, the LC layer may be formed to have two different thicknesses (cell gaps) between the transmissive regions and the reflective regions. For example, a plurality of organic insulator patterns are formed in the reflective regions such that cell gaps of the transmissive regions have twice the thickness as those of the reflective regions.

Manufacturing processes for a liquid crystal display are classified into a display panel manufacturing process, an alignment process, a liquid crystal cell process of filling liquid crystals between two display panels opposite each other, and a module process of attaching a driver IC, mounting back light, etc.

In the liquid crystal cell process, vacuum injection or drop injection fills the cells with liquid crystal.

With vacuum injection, a sealant with a liquid crystal inlet hole is printed around a substrate of one of two display panels. The substrates of two display panels are then aligned and assembled with each other through a hot press process with the thermal-hardening sealant. The assembled panels are put into a vacuum vessel such that the liquid crystal inlet hole of the sealer is dipped into liquid crystal. In this way, the liquid crystal is injected between two panels. Finally, the liquid crystal inlet hole is sealed such that the injected liquid crystal is contained.

With drop injection, a seal is formed around a substrate of one of two display panels in the shape of a closed curve, and then a liquid crystal is dropped onto the substrate. The substrates of two display panels are aligned, and assembled with each other by way of the seal. Finally, the seal is hardened.

As described above, the vacuum injection includes many processes such as forming a seal, aligning and assembling two display panels, putting the two display panels into a vacuum vessel, dipping into the liquid crystals, sealing the liquid crystal inlet hole, etc., such that manufacturing time and cost are increased. Accordingly, drop injection may be more economical than the vacuum injection.

However, in the transflective liquid crystal display, the organic insulator patterns formed in the reflective regions cause a height difference between regions having the organic insulator patterns and the other regions, and therefore the dripped liquid crystal in drop injection may move slowly and non-uniformly. Accordingly, the non-uniform dispersion of the liquid crystals may cause a non-uniform cell gap and vapor in liquid crystals and the liquid crystal display may appear to be stained.

SUMMARY OF THE INVENTION

A liquid crystal display according to an embodiment of the present invention includes a first substrate, a plurality of pixel electrodes formed on the first substrate and including a plurality of transparent electrodes and a plurality of reflective electrodes formed on portions of the transparent electrodes, a second substrate facing the first substrate, a liquid crystal layer interposed between the first substrate and the second substrate, and a plurality of organic insulator patterns formed in regions corresponding to the reflective electrodes. The organic insulator patterns are disposed adjacent to each other per two pixel electrodes in a column direction and the deposition is periodically repeated per every two pixel electrodes.

The liquid crystal layer may be formed using drop injection.

The organic insulator patterns may have a square planar shape including one side having the same length as the one short side of the pixel electrode.

The thickness of regions including the transparent electrode and the reflective electrode may be about half as large as that of regions including the transparent electrode.

The organic insulator patterns may be disposed on the first substrate, and the organic insulator patterns may be formed between the first substrate and the pixel electrodes.

The organic insulator patterns may have an embossed surface, and the pixel electrodes may be curved along the embossed surface of the organic insulator pattern.

The organic insulator patterns may be formed on the second substrate.

The liquid crystal display may further include a plurality of gate lines extending in a row direction and including a plurality of gate electrodes, a plurality of data lines extending in a column direction and including a plurality of source electrodes, and a plurality of thin film transistors including the gate electrodes, drain electrodes electrically connected to the pixel electrodes, and the source electrodes.

Every two gate lines and every two thin film transistors may be disposed adjacent to each other in a column direction, respectively, and the deposition may be periodically repeated in a column direction.

The thin film transistors may be disposed under the organic insulator patterns.

The area of the reflective electrodes may be under about 50% of that of the transparent electrode.

The organic insulator patterns may be formed in regions corresponding to the transparent electrodes.

A liquid crystal display according to another embodiment of the present invention includes a first substrate, a plurality of pixel electrodes formed on the first substrate and including a plurality of transparent electrodes and a plurality of reflective electrodes formed on portions of the transparent electrodes, a second substrate facing the first substrate, a liquid crystal layer interposed between the first substrate and the second substrate, and a plurality of organic insulator patterns formed in regions corresponding to the reflective electrodes. The organic insulator patterns may have a planar shape having two sides respectively shorter than two sides of the pixel electrodes.

The liquid crystal layer may be formed using a drop injection.

Thickness of regions including the transparent electrode and the reflective electrode may be about half as large as that of regions including the transparent electrode.

The organic insulator pattern may have a planar shape of a polygon having a side that is shorter than one side of the pixel electrode.

The organic insulator patterns may have a planar shape of a rectangle or a right triangle.

The organic insulator patterns may be disposed on the first substrate, and the pixel electrodes may be formed on the first substrate and the organic insulator patterns.

The organic insulator patterns may have an embossed surface, and the pixel electrodes may be curved along the embossed surface of the organic insulator pattern.

The organic insulator patterns may be formed on the second substrate.

The area of the reflective electrodes may be above about 50% of that of the transparent electrode.

The organic insulator patterns may be periodically disposed in the same position for every pixel in a column direction.

The liquid crystal display may further include a plurality of gate lines extending in a row direction and including a plurality of gate electrodes, a plurality of data lines extending in a column direction and including a plurality of source electrodes, and a plurality of thin film transistors including the gate electrodes, drain electrodes electrically connected to the pixel electrodes, and the source electrodes.

Every two gate lines may be disposed adjacent to each other in a row direction, every two data lines may be disposed adjacent to each other in a column direction, and every four of the thin film transistors including two of a row direction and two of a column direction may be disposed adjacent to one another.

The thin film transistors may be disposed under the organic insulator patterns.

The organic insulator patterns may be formed in regions corresponding to the transparent electrodes.

A manufacturing method for a liquid crystal display according to an embodiment of the present invention includes forming a plurality of thin films, including a plurality of organic insulator patterns, a plurality of transparent electrodes, and a plurality of reflective electrodes on portions of the transparent electrodes, on a first substrate to form a first display panel, forming a plurality of thin films on a second substrate to form a second display panel, forming a sealer around the first display panel with a closed curved line, dripping liquid crystals on the first display panel, aligning the second display panel facing the first display panel, assembling the facing first and second display panels, and hardening the sealer disposed between the first display panel and the second display panel. The organic insulator patterns are formed in regions corresponding to the reflective electrodes, the organic insulator patterns are disposed adjacent to each other per two pixel electrodes in a column direction, and the deposition is periodically repeated for every two pixel electrodes.

A manufacturing method for a liquid crystal display according to another embodiment of the present invention includes forming a plurality of thin films including a plurality of organic insulator patterns on a first substrate to form a first display panel, forming a plurality of thin films, including a plurality of transparent electrodes and a plurality of reflective electrodes on portions of the transparent electrodes, on a first substrate to form a first display panel, forming a sealer around the first display panel with a closed curved line, dripping liquid crystals on the first display panel, aligning the second display panel facing the first display panel, assembling the facing first and second display panels, and hardening the sealer disposed between the first display panel and the second display panel. The organic insulator patterns are formed in regions corresponding to the reflective electrodes, the organic insulator patterns are disposed adjacent to each other per two pixel electrodes in a column direction, and the deposition is periodically repeated for every two pixel electrodes.

A manufacturing method for a liquid crystal display according to another embodiment of the present invention includes forming a plurality of thin films, including a plurality of organic insulator patterns, a plurality of transparent electrodes, and a plurality of reflective electrodes on portions of the transparent electrodes, on a first substrate to form a first display panel, forming a plurality of thin films on a second substrate to form a second display panel, forming a sealer around the first display panel with a closed curved line, dripping liquid crystals on the first display panel, aligning the second display panel facing the first display panel, assembling the facing first and second display panels, and hardening the sealer disposed between the first display panel and the second display panel. The organic insulator patterns are formed in regions corresponding to the reflective electrodes and the organic insulator patterns have a planar shape of a polygon having two sides respectively shorter than two sides of the pixel electrodes.

A manufacturing method for a liquid crystal display according to another embodiment of the present invention includes forming a plurality of thin films including a plurality of organic insulator patterns on a first substrate to form a first display panel, forming a plurality of thin films, including a plurality of transparent electrodes and a plurality of reflective electrodes on portions of the transparent electrodes, on a first substrate to form a first display panel, forming a sealer around the first display panel with a closed curved line, dripping liquid crystals on the first display panel, aligning the second display panel facing the first display panel, assembling the facing first and second display panels, and hardening the sealer disposed between the first display panel and the second display panel. The organic insulator patterns are formed in regions corresponding to the reflective electrodes and the organic insulator patterns have a planar shape of a polygon having two sides respectively shorter than two sides of the pixel electrodes.

The organic insulator patterns may have a planar shape of a rectangle or a right triangle.

The liquid crystal display may include a plurality of pixels, and every four organic insulator patterns including two of a row direction and two of a column direction may be disposed adjacent to one another.

DETAILED DESCRIPTION OF THE EMBODIMENTS

Figure 1:
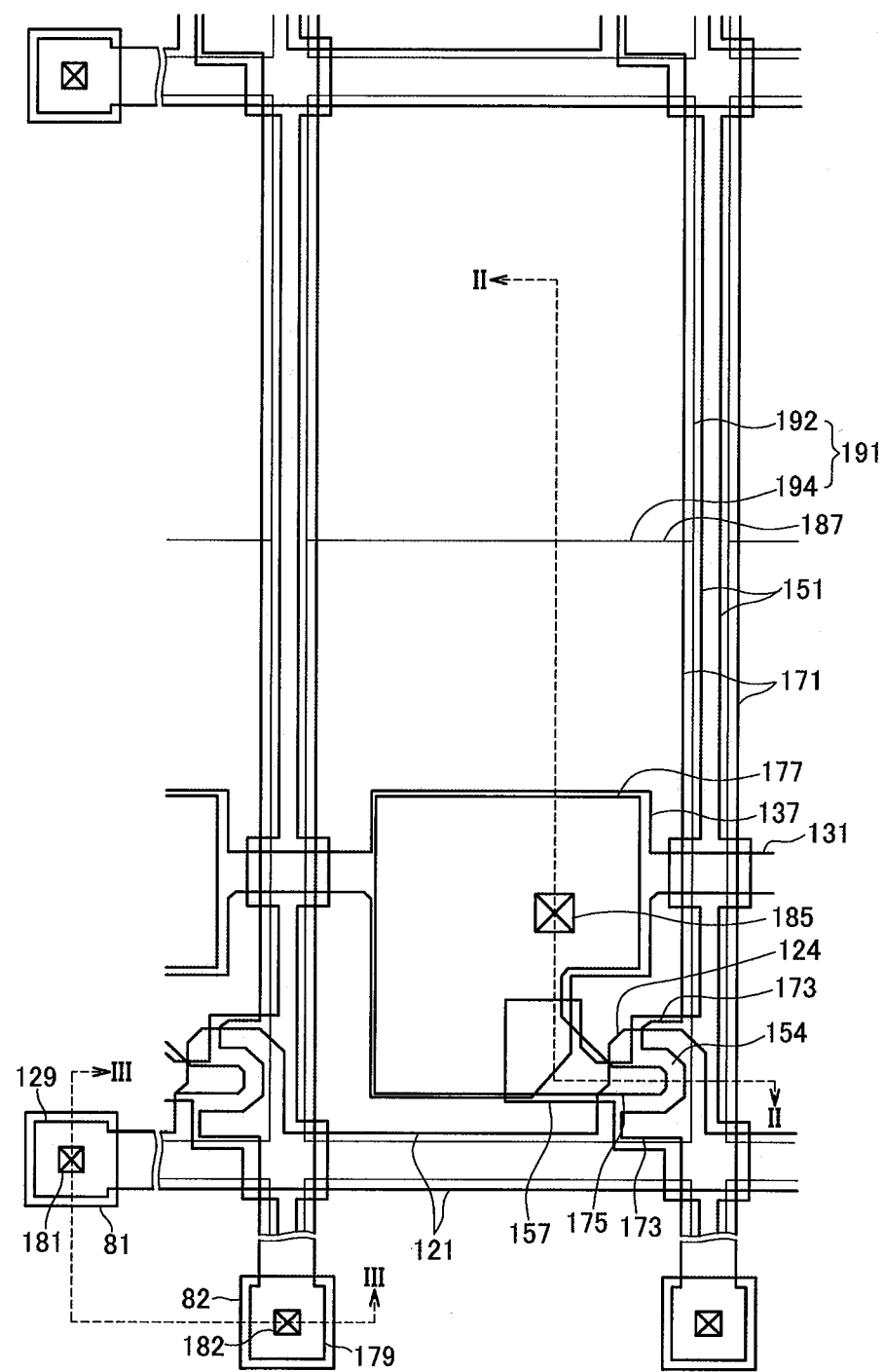
FIG. 1 is a layout view of a liquid crystal display according to an embodiment of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Preferred embodiments of the present invention will now be described more fully hereinafter with reference to the accompanying drawings.

First, a liquid crystal display according to an embodiment of the present invention will be described in detail with reference to FIG. 1 to FIG. 3.

Figure 2:
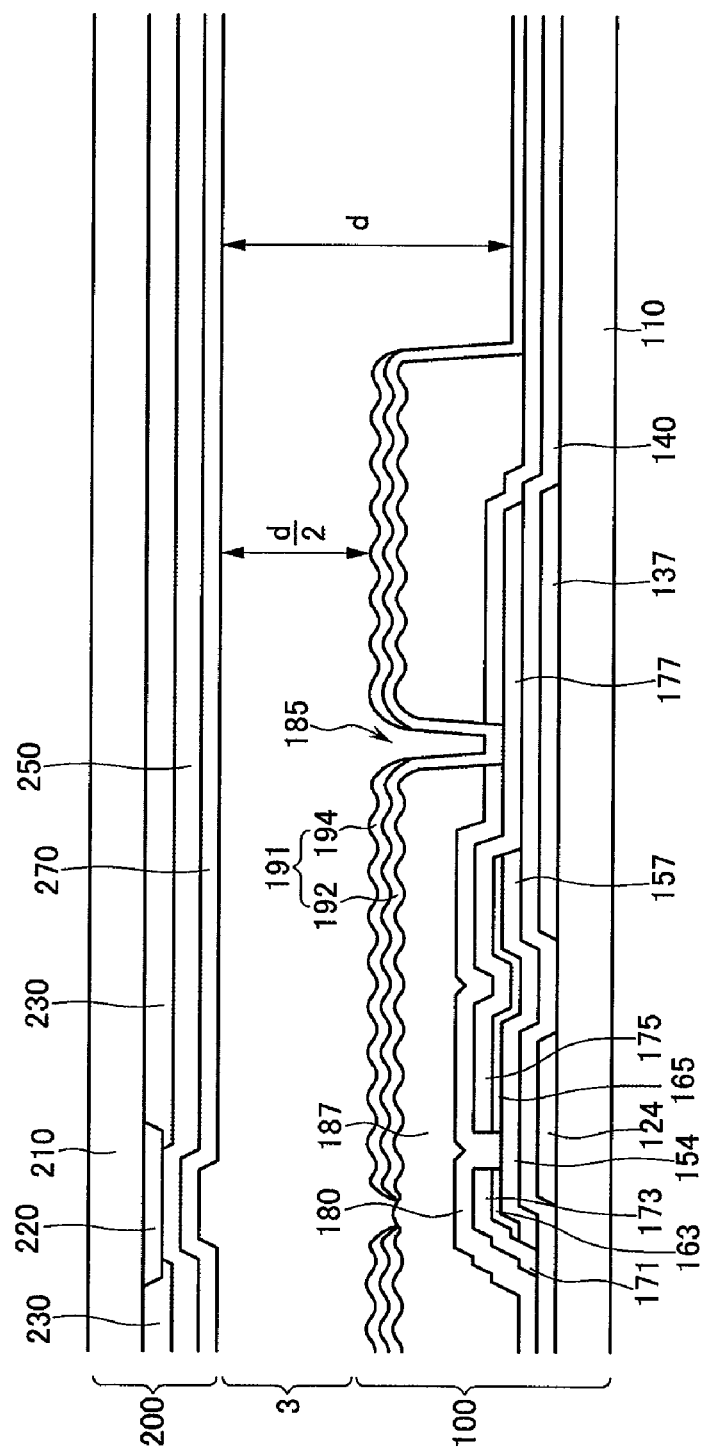
FIG. 2 and FIG. 3 are sectional views of the liquid crystal display shown in FIG. 1 taken along the lines II-II and III-III, respectively.
Figure 3:
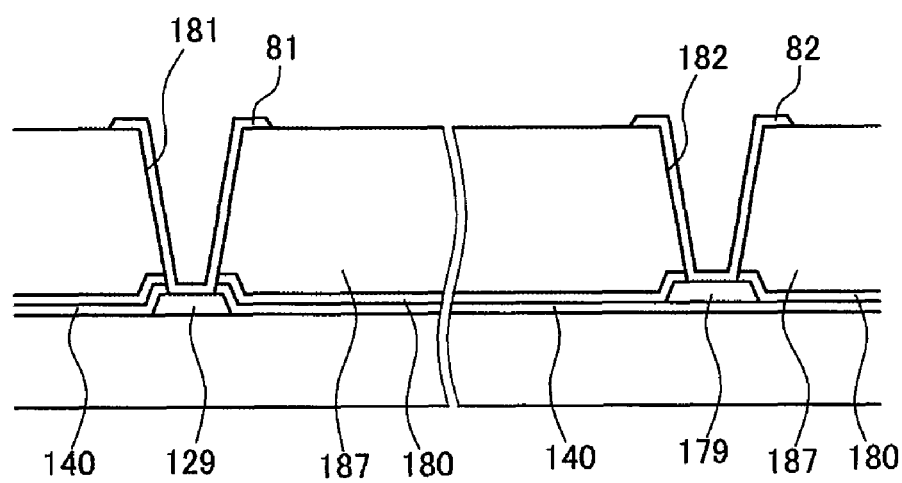

FIG. 1 is a layout view of a liquid crystal display according to an embodiment of the present invention, and FIG. 2 and FIG. 3 are sectional views of the liquid crystal display shown in FIG. 1 taken along the lines II-II and III-III, respectively.

A liquid crystal display according to an embodiment of the present invention includes a thin film transistor array panel 100, a common electrode panel 200 facing the thin film transistor array panel 100, and a liquid crystal layer 3 including a plurality of liquid crystal molecules and interposed between the two panels 100 and 200.

First, the thin film transistor array panel 100 will be described.

A plurality of gate lines 121 and a plurality of storage electrode lines 131 are formed on an insulating substrate 110 made of a material such as transparent glass or plastic.

The gate lines 121 transmit gate signals and extend substantially in a horizontal direction. Each of the gate lines 121 includes a plurality of gate electrodes 124 projecting upward therefrom and an end portion 129 having a large area for contact with another layer or an external driving circuit. A gate driving circuit (not shown) for generating the gate signals may be mounted on a flexible printed circuit ("FPC") film (not shown), which may be attached to the substrate 110, directly mounted on the substrate 110 or integrated onto the substrate 110. The gate lines 121 may extend to be connected to a driving circuit that may be integrated on the substrate 110.

The storage electrode lines 131 are supplied with a predetermined voltage and extend substantially parallel to the gate lines 121. Each of the storage electrode lines 131 is disposed between two adjacent gate lines 121 and disposed closer to the lower of the two gate lines 121. Each of the storage electrode lines 131 includes a storage electrode 137 expanding upward and downward therefrom. However, the storage electrode lines 131 may have various shapes and arrangements.

The gate lines 121 and the storage electrode lines 131 are preferably made of an Al-containing metal such as Al and an Al alloy, a Ag-containing metal such as Ag and a Ag alloy, a Cu-containing metal such as Cu and a Cu alloy, a Mo-containing metal such as Mo and a Mo alloy, Cr, Ta, or Ti. However, they may have a multi-layered structure including two conductive films (not shown) having different physical characteristics. One of the two films is preferably made of a low resistivity metal including an Al-containing metal, a Ag-containing metal, and a Cu-containing metal for reducing signal delay or voltage drop. The other film is preferably made of a material such as a Mo-containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate lines 121 and the storage electrode lines 131 may be made of various metals or conductors.

The lateral sides of the gate lines 121 and the storage electrode lines 131 are inclined relative to a surface of the substrate 110, and the inclination angles thereof range from about 30 to 80 degrees.

A gate insulating layer 140 preferably made of silicon nitride (SiNx) or silicon oxide (SiOx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each of the semiconductor stripes 151 extends substantially in the longitudinal direction and includes a plurality of projections 154 branched out toward the gate electrodes 124 and a plurality of projections 157 branched out toward the storage electrode 137 from the projections 154. The semiconductor stripes 151 become wide near the gate lines 121 and the storage electrode lines 131 such that the semiconductor stripes 151 cover large areas of the gate lines 121 and the storage electrode lines 131.

A plurality of ohmic contact stripes and islands 161 and 165 are formed on the semiconductor stripes 151. The ohmic contact stripes and islands 161 and 165 are preferably made of n+ hydrogenated a-Si heavily doped with an n-type impurity such as phosphorous, or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range of about 30 to 80 degrees.

A plurality of data lines 171 and a plurality of drain electrodes 175 are formed on the ohmic contacts 161 and 165 and on the gate insulating layer 140.

The data lines 171 transmit data signals and extend substantially in the longitudinal direction to intersect the gate lines 121 and the storage electrode lines 131. Each data line 171 includes a plurality of source electrodes 173 projecting toward the gate electrodes 124, and an end portion 179 having a large area for contact with another layer or an external driving circuit. A data driving circuit (not shown) for generating the data signals may be mounted on an FPC film (not shown), which may be attached to the substrate 110, directly mounted on the substrate 110, or integrated with the substrate 110. The data lines 171 may extend to be connected to a driving circuit that may be integrated with the substrate 110.

The drain electrodes 175 are separated from the data lines 171 and disposed opposite the source electrodes 173 with respect to the gate electrodes 124. Each of the drain electrodes 175 includes a wide end portion 177 and a narrow end portion. The wide end portion 177 overlaps a storage electrode 137 of a storage electrode line 131 and the narrow end portion is partly enclosed by a source electrode 173.

A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of a refractory metal such as Cr, Mo, Ta, Ti, or alloys thereof. However, they may have a multi-layered structure including a refractory metal film (not shown) and a low resistivity film (not shown). Good examples of the multi-layered structure are a double-layered structure including a lower Cr/Mo (alloy) film and an upper Al (alloy) film, and a triple-layered structure of a lower Mo (alloy) film, an intermediate Al (alloy) film, and an upper Mo (alloy) film. However, the data lines 171 and the drain electrodes 175 may be made of various metals or conductors.

The data lines 171 and the drain electrodes 175 have inclined edge profiles, and the inclination angles thereof range from about 30 to 80 degrees.

The ohmic contacts 161 and 165 are interposed only between the underlying semiconductor stripes 151 and the overlying conductors 171 and 175 thereon, and reduce the contact resistance therebetween. Although the semiconductor stripes 151 are narrower than the data lines 171 at most places, the width of the semiconductor stripes 151 becomes large near the gate lines 121 and the storage electrode lines 131 as described above, to smooth the profile of the surface, thereby preventing disconnection of the data lines 171. The semiconductor stripes 151 include some exposed portions that are not covered with the data lines 171 and the drain electrodes 175 such as portions located between the source electrodes 173 and the drain electrodes 175.

A passivation layer 180 is formed on the data lines 171, the drain electrodes 175, and the exposed portions of the semiconductor stripes 151.

The passivation layer 180 preferably made of an inorganic insulator or an organic insulator, and may have a flat surface. Examples of the inorganic insulator are silicon nitride and silicon oxide. The organic insulator may have a dielectric constant of less than about 4.0, and photosensitivity. However, the passivation layer 180 may include a lower film of an inorganic insulator and an upper film of an organic insulator such that it takes the excellent insulating characteristics of the organic insulator while preventing the exposed portions of the semiconductor stripes 151 and 157 from being damaged by the organic insulator.

A plurality of organic insulator patterns 187 are formed on portions of the passivation layer 180.

Each organic insulator pattern 187 may have a dielectric constant of less than about 4.0, photosensitivity, and an embossed surface.

The passivation layer 180 and the organic insulator pattern 187 have a plurality of contact holes 182 and 185 exposing the end portions 179 of the data lines 171 and the drain electrodes 175, respectively. The passivation layer 180, the organic insulator pattern 187, and the gate insulating layer 140 have a plurality of contact holes 181 exposing the end portions 129 of the gate lines 121.

A plurality of pixel electrodes 191 and a plurality of contact assistants 81 and 82 are formed on the passivation layer 180.

Portions of the pixel electrodes 191 are curved along the embossed surface of the organic insulator pattern 187, and each pixel electrodes 191 includes a transmissive electrode 192 and a reflective electrode 194 thereon. The transmissive electrodes 192 are preferably made of a transparent conductor such as ITO or IZO, and the reflective electrodes 194 are preferably made of reflective metals such as Ag, Al, Cr, or alloys thereof. However, the reflective electrode 194 may have a double-layered structure including a reflective upper film of a low-resistivity material such as Al, Ag, or alloys thereof, and a lower film having a good contact characteristic with ITO or IZO such as a Mo-containing metal, Cr, Ta, and Ti.

The reflective electrode 194 is disposed on a portion of the transmissive electrode 192, and thereby the remaining portion of the transmissive electrode 192 is exposed. The reflective electrode 194 is disposed in a region corresponding to the organic insulator pattern 187.

The organic insulator 187 has a rectangular planar shape including one side having the same length as the one side of the pixel electrode 191.

The pixel electrodes 191 are physically and electrically connected to the drain electrodes 175 through the contact holes 185 such that the pixel electrodes 191 receive data voltages from the drain electrodes 175.

The pixel electrodes 191 that are supplied with the data voltages generate electric fields in cooperation with a common electrode 270 of the common electrode panel 200 that is supplied with a common voltage, which determine the orientations of LC molecules (not shown) of an LC layer 3 disposed between the two electrodes 191 and 270 to adjust polarization of incident light passing through the LC layer 3. A pixel electrode 191 and the common electrode 270 form a capacitor referred to as a "liquid crystal capacitor," which stores applied voltages after the TFT turns off.

A transflective LCD including the TFT array panel 100, the common electrode panel 200, and the LC layer 3 according to an embodiment of the present invention includes a plurality of transmissive regions TA and a plurality of reflective regions RA defined by the transmissive electrodes 192 and the reflective electrodes 194, respectively.

In detail, areas disposed under and over the organic insulator 187 are the transmissive regions TA, and areas disposed under and over the reflective electrodes 194 are the reflective regions RA. The area of the reflective region RA of the liquid crystal display according to the embodiment of the present invention may be less than about 50% of the area of the pixel electrode 191. Accordingly, the transmissive region TA may be larger than the reflective region RA in each pixel of the liquid crystal display.

In the transmissive regions TA, light from a backlight unit (not shown) disposed under the TFT array panel 100 passes through the LC layer 3 to display desired images. In the reflective regions RA, external light such as sunlight that is incident thereon passes through the common electrode panel 200 and through the LC layer 3 to reach the reflective electrodes 194. Then, the external light is reflected by the reflective electrodes 194 and passes through the LC layer 3 again, to display desired images. At this time, the embossed surface of the reflective electrode 194 enhances reflective efficiency.

The transmissive regions TA do not have the organic insulator patterns 187 such that a cell gap d in transmissive regions TA is larger than a cell gap d/2 in the reflective regions RA. The cell gap d in transmissive regions TA is twice as large as the cell gap d/2 in the reflective regions RA.

The thin film transistors are disposed under the organic insulator patterns 187 and the reflective electrodes 194 such that aperture ratio of the liquid crystal display may be improved.

A pixel electrode 191 and an expansion 177 of a drain electrode 175 electrically connected thereto overlap a storage electrode line 131 to form an additional capacitor referred to as a "storage capacitor," which enhances the voltage storing capacity of the liquid crystal capacitor.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

A description of the common electrode panel 200 follows.

A light blocking member 220 is formed on an insulating substrate 210 made of a material such as transparent glass or plastic. The light blocking member 220 is referred to as a black matrix, and it prevents light leakage. The light blocking member 200 has a plurality of aperture regions facing the pixel electrodes 191.

A plurality of color filters 230 are also formed on the substrate 210, and they are placed substantially within the aperture regions enclosed by the light blocking member 220. The color filters 230 may extend substantially in the longitudinal direction along the pixel electrodes 191.

The color filters 230 may extend substantially in the longitudinal direction along the pixel electrodes 191. The color filters 230 may represent one of the primary colors such as red, green, and blue colors.

Though it is not shown, the color filters 230 may have a position-dependent thickness such that a thickness of the color filters 230 disposed in the transmissive region TA may be thicker than that disposed in the reflective region RA. An average thickness of the color filters 230 disposed in the transmissive region TA may be about twice of that disposed in the reflective region RA.

As described above, in the transflective liquid crystal display, light passes through an LC layer only once in the transmissive region and light passes through the LC layer twice in the reflective region in each pixel. Accordingly, a difference of color tone between the transmissive regions and the reflective regions may occur. As described above, in the liquid crystal display according to an embodiment of the present invention, an average thickness of the color filters 230 disposed in the transmissive region TA may be about twice of that disposed in the reflective region RA such that color tone between the reflective region RA and the transmissive region TA may be substantially uniform.

An overcoat layer 250, made of an organic material, is formed on the light-blocking member 220 and the color filters 230 to protect the color filters 230. The overcoat layer 250 may be omitted.

The common electrode 270 is formed on the overcoat layer 250. The common electrode 270 may be made of a transparent conductive material such as ITO or IZO.

Now, a liquid crystal display according to another embodiment of the present invention will be described with reference to FIG. 4 to FIG. 6.

Figure 4:
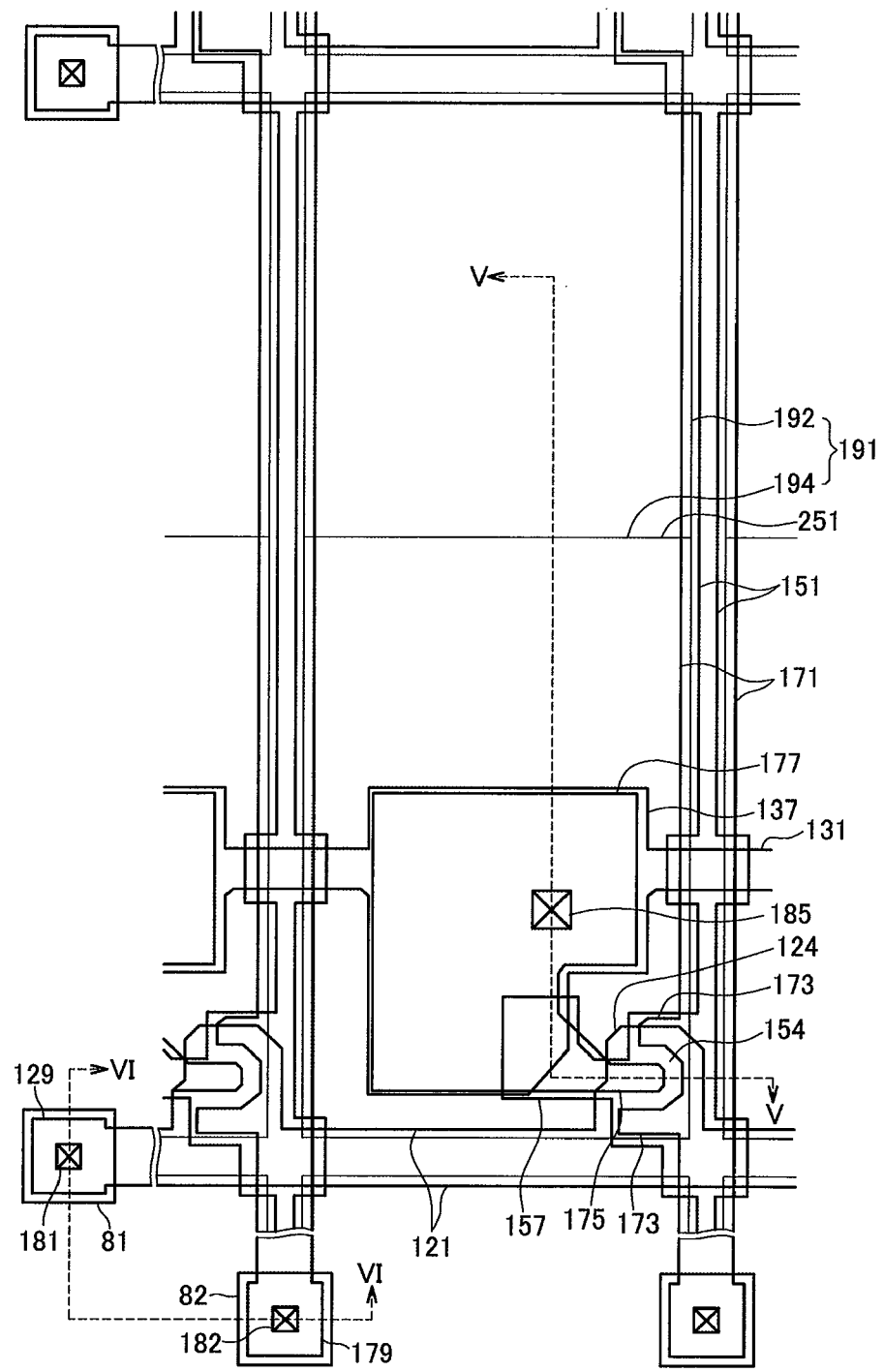
FIG. 4 is a layout view of a liquid crystal display according to another embodiment of the present invention.
Figure 5:
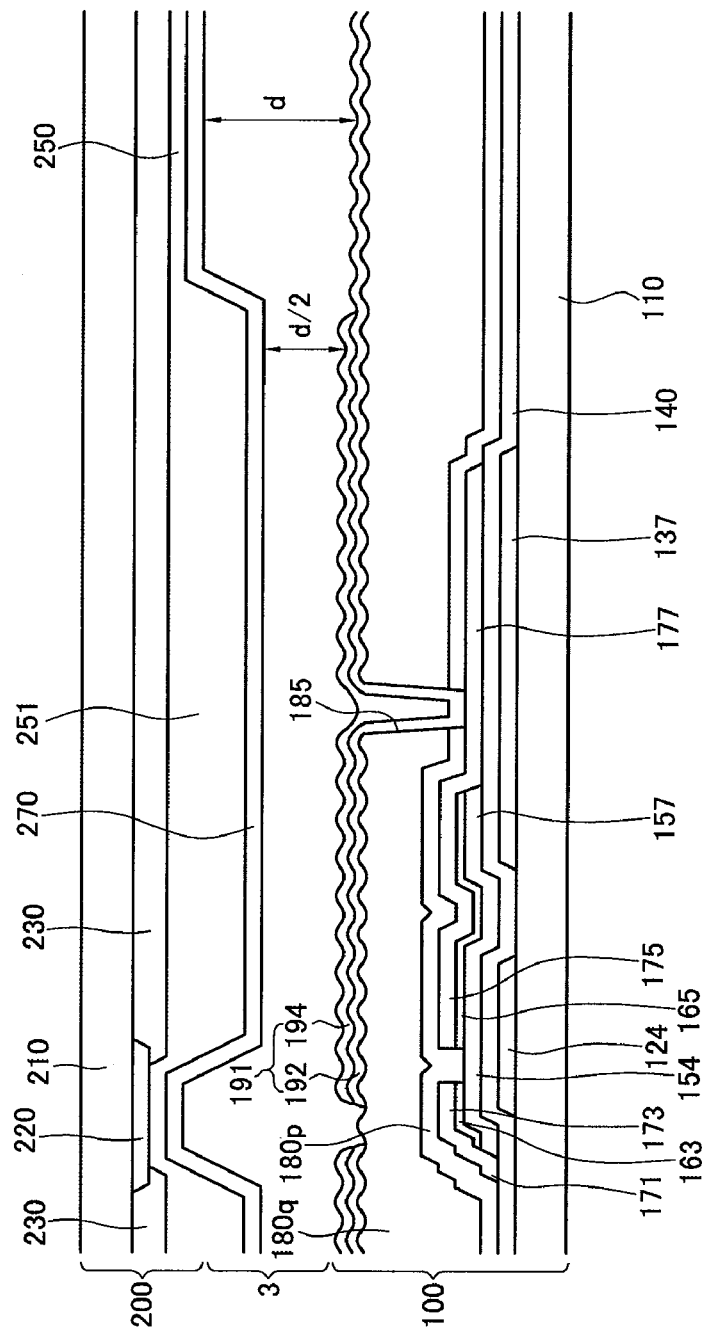
FIG. 5 and FIG. 6 are sectional views of the liquid crystal display shown in FIG. 4 taken along the lines V-V and VI-VI, respectively.
Figure 6:
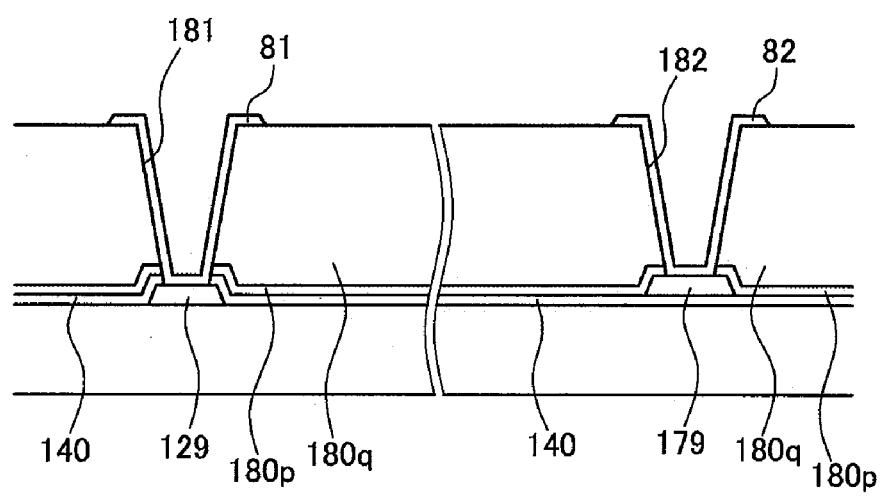

FIG. 4 is a layout view of a liquid crystal display according to another embodiment of the present invention, and FIG. 5 and FIG. 6 are sectional views of the liquid crystal display shown in FIG. 1 taken along the lines V-V and VI-VI, respectively.

As shown in FIG. 4 to FIG. 6, a layered structure of a liquid crystal display according to the present embodiment is substantially the same as that shown in FIG. 1 to FIG. 3.

Firstly, in a thin film transistor array panel 100, a plurality of gate lines 121 including a plurality of gate electrodes 124 and end portions 129, and a plurality of storage electrode lines 131 including a plurality of storage electrodes 137 are formed on a substrate 110. A gate insulating layer 140, a plurality of semiconductor stripes 151 including projections 154, a plurality of ohmic contact stripes 161 including projections 163, and a plurality of ohmic contact islands 165 are sequentially formed on the gate lines 121 and the storage electrode lines 131.

A plurality of data lines 171 including source electrodes 173 and end portions 179, and a plurality of drain electrode 175 including a plurality of projections 177, are formed on the ohmic contacts 161 and 165, and a passivation layer 180 is formed thereon. The passivation layer 180 includes a lower passivation film 180$p$ preferably made of an inorganic insulator and an upper passivation film 180$q$ preferably made of an organic insulator. The upper passivation film 180$q$ has an embossed surface. The passivation layer 180 has a plurality of contact holes 181, 182, and 185, and the passivation layer 180 and the gate insulating layer 140 have a plurality of contact holes 181.

A plurality of pixel electrodes 191 are formed on the upper passivation layer 180q. Each pixel electrode 191 includes a transmissive electrode 192 and a reflective electrode 194. The reflective electrode 194 is formed on a portion of the transmissive electrode 192. The pixel electrode 191 is curved along the embossed surface of the upper passivation film 180q.

Next, in a common electrode panel 200, a plurality of light blocking members 220, a plurality of color filters 230, an overcoat 250, and a common electrode 270 are sequentially formed on a substrate 210. The overcoat 250 includes a plurality of organic insulator patterns 251.

However, unlike the liquid crystal display shown in FIG. 1 to FIG. 3, the organic insulator patterns 251 for adjusting cell gaps of the liquid crystal display in transmissive regions TA and the reflective regions RA are formed on the common electrode panel 200. In addition, the thin film transistor array panel 100 according to the embodiment does not include the organic insulator patterns 187 shown in FIG. 1 to FIG. 3. The organic insulator patterns 251 have the same planar shape as the organic insulator patterns 187 shown in FIG. 1 to FIG. 3.

The organic insulator patterns 251 are formed in regions corresponding to the reflective electrodes 194 of the thin film transistor array panel 100. Accordingly, the cell gap d in transmissive regions TA is twice as large as the cell gap d/2 in the reflective regions RA.

Now, the organic insulator patterns 187 and 251 of the liquid crystal display according to the above embodiments will be described in more detail with reference to FIG. 7.

Figure 7:
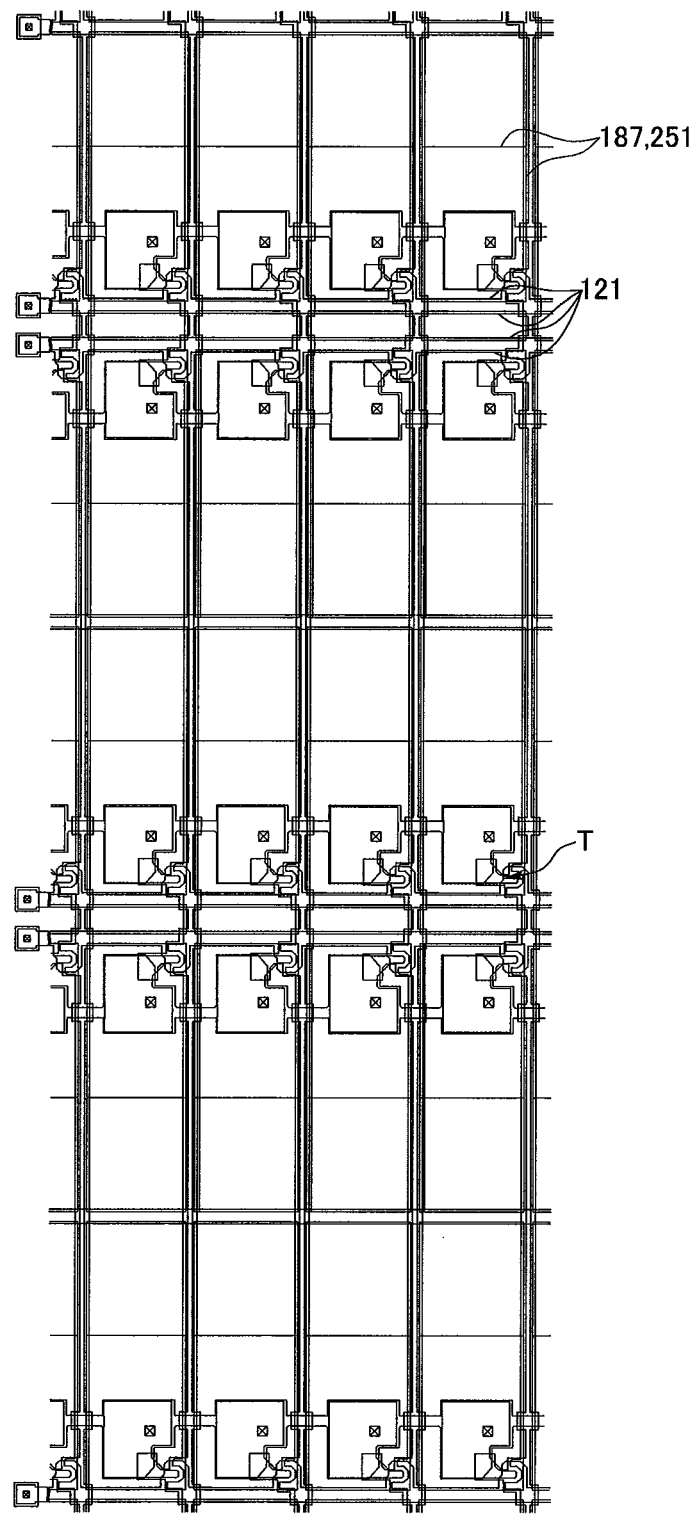
FIG. 7 is a layout view representing a plurality of pixels of the liquid crystal display shown in FIG. 1 to FIG. 3 or FIG. 4 to FIG. 6.

FIG. 7 is a layout view representing a plurality of pixels of the liquid crystal display shown in FIG. 1 to FIG. 3 or FIG. 4 to FIG. 6.

Referring to FIG. 7, the liquid crystal display includes a plurality of gate lines 121 extending in a row direction. Each two gate lines 121 are disposed adjacent to each other, and the disposition is periodically repeated in a column direction. The liquid crystal display includes a plurality of pixels. The thin film transistors T of the pixels including a gate electrode 124 extended from the gate line 121 are disposed under the organic insulator patterns 187 or 251. Each two thin film transistors T are disposed adjacent to each other in a column direction, and the deposition is periodically repeated per every two pixels.

The pixels include the organic insulator patterns 187 or 251, and the organic insulator patterns 187 or 251 of the pixels are disposed adjacent to each other periodically per every two pixels in a column direction. As described above, the reflective regions RA disposed under or above the organic insulator patterns 187 or 251 of the liquid crystal display according to the present embodiments have smaller areas than the transmissive regions TA.

A manufacturing method of a liquid crystal display according to an embodiment of the present invention will be now described with reference to FIG. 8A to FIG. 8C.

Figure 8A:
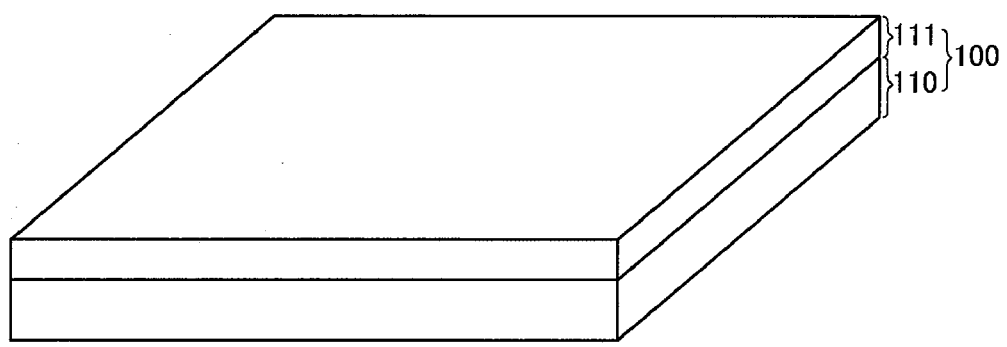
FIG. 8A to FIG. 8C are sectional views of the liquid crystal display in intermediate steps of a manufacturing method thereof according to an embodiment of the present invention.
Figure 8B:
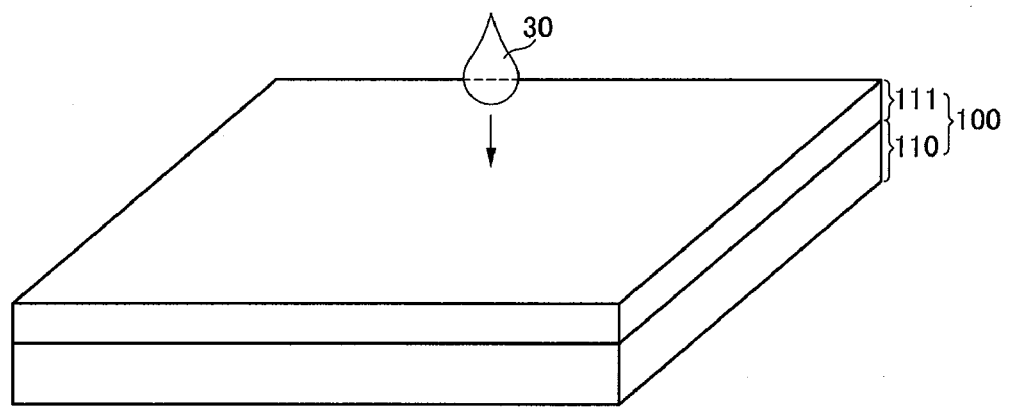

Referring to FIG. 8A, a thin film layer 111 including gate lines, data lines, thin film transistors, organic insulator patterns, pixel electrodes, etc. is formed on a substrate 110 to complete a thin film transistor array panel 100, and a thin film layer 211 including a common electrode etc. is formed on a substrate 210 to complete a common electrode panel 200. A sealer is formed around the thin film transistor array panel 100 with a closed curved line. Liquid crystals 30 are dripped on the thin film transistor array panel 100 as shown in FIG. 8B.

Figure 8C:
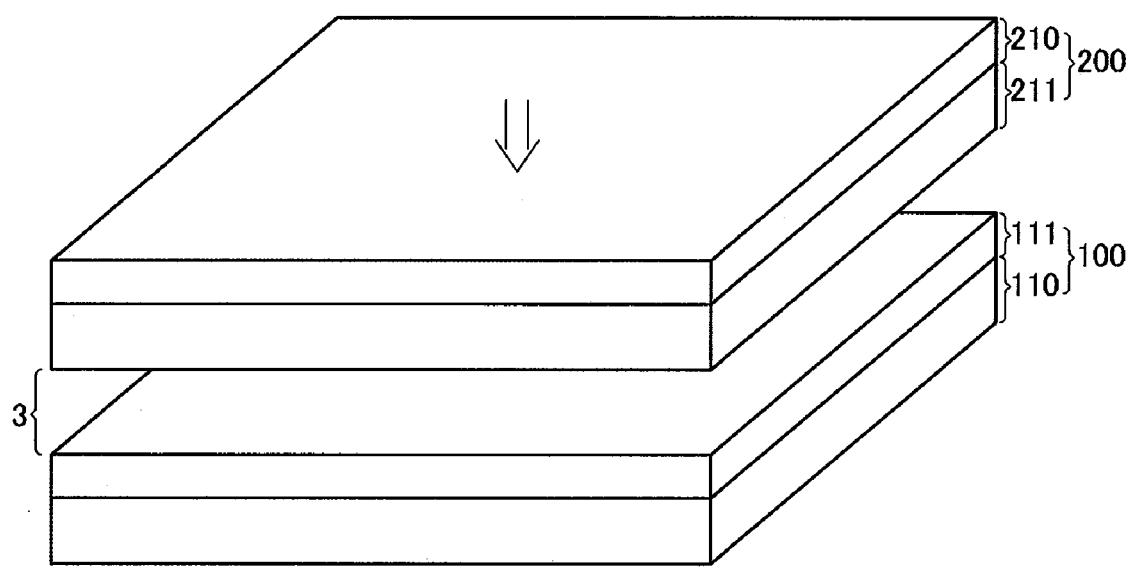

Next, the common electrode panel 200 is aligned with the thin film transistor array panel 100 including the dripped liquid crystals 30, and the two display panels 100 and 200 are assembled with each other by way of the sealer as shown in FIG. 8C. The dripped liquid crystals 30 are uniformly dispersed between the two display panels 100 and 200. The assembled display panels 100 and 200 are processed to harden the sealer to form the liquid crystal display.

Although the manufacturing method according to the present embodiment includes the dripping process of the liquid crystals on the thin film transistor array panel 100 including the organic insulator patterns 187 and the aligning of the common electrode panel 200 on the thin film transistor array panel 100, a manufacturing method according to another embodiment may include a dripping process of the liquid crystals on a common electrode panel 200 and the aligning of a thin film transistor array panel 100 on the common electrode panel 200. The thin film transistor array panel 100 may not include the organic insulator patterns 187 for adjusting the cell gap between the reflective regions TA and the transmissive regions TA, and the common electrode panel 200 may include the organic insulator patterns 251.

The liquid crystal display according to the previous embodiments includes the organic insulator patterns 187 or 251 disposed adjacent to each other per every two pixels in a column direction as shown in FIG. 7. The deposition of the organic insulator patterns 187 or 251 is periodically repeated per every two pixels. The area of the reflective regions RA including the organic insulator patterns 187 and 251 may be less than about 50% of that of the pixel electrodes 191 such that the reflective regions RA disposed under or above the organic insulator patterns 187 or 251 have smaller areas than the transmissive regions TA.

Accordingly, effects of a height difference between the reflective regions RA and the transmissive regions TA caused by the organic insulator pattern 187 or 251 of the liquid crystal display of the present invention have a longer period than the known liquid crystal display including a plurality of organic insulator patterns disposed at same position every pixel. Thereby, the dripped liquid crystals 30 on the display panel 100 or 200 including the organic insulator patterns 187 or 251 may move more rapidly and uniformly in the manufacturing method of the liquid crystal display according to the embodiments of the present invention than the known liquid crystal display including a plurality of organic insulator patterns disposed at the same position for every pixel.

Now, a liquid crystal display according to another embodiment of the present invention will be described in detail with reference to FIG. 9 to FIG. 11 and FIG. 12 to FIG. 14.

Figure 9:
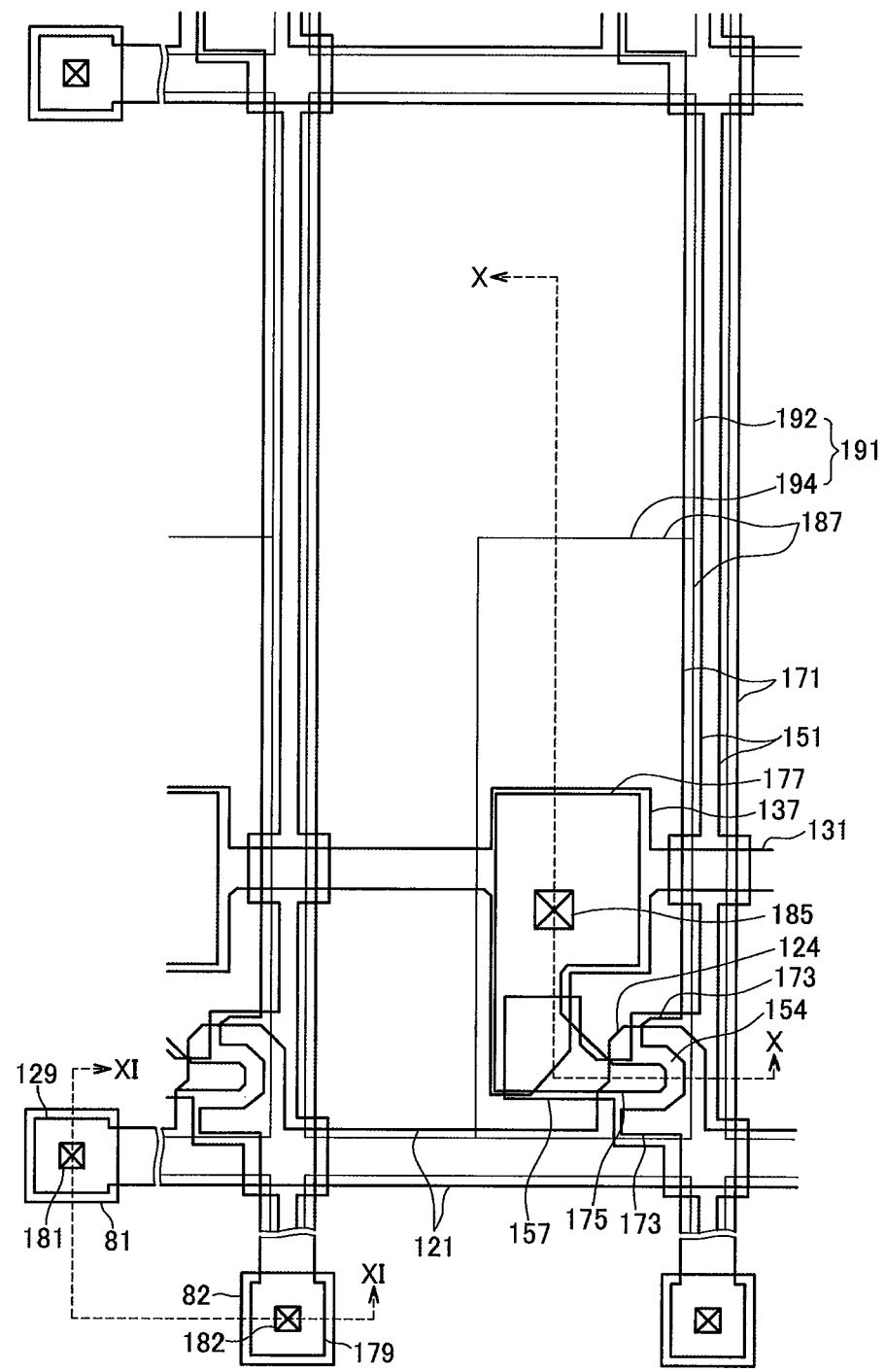
FIG. 9 is a layout view of a liquid crystal display according to another embodiment of the present invention.
Figure 10:
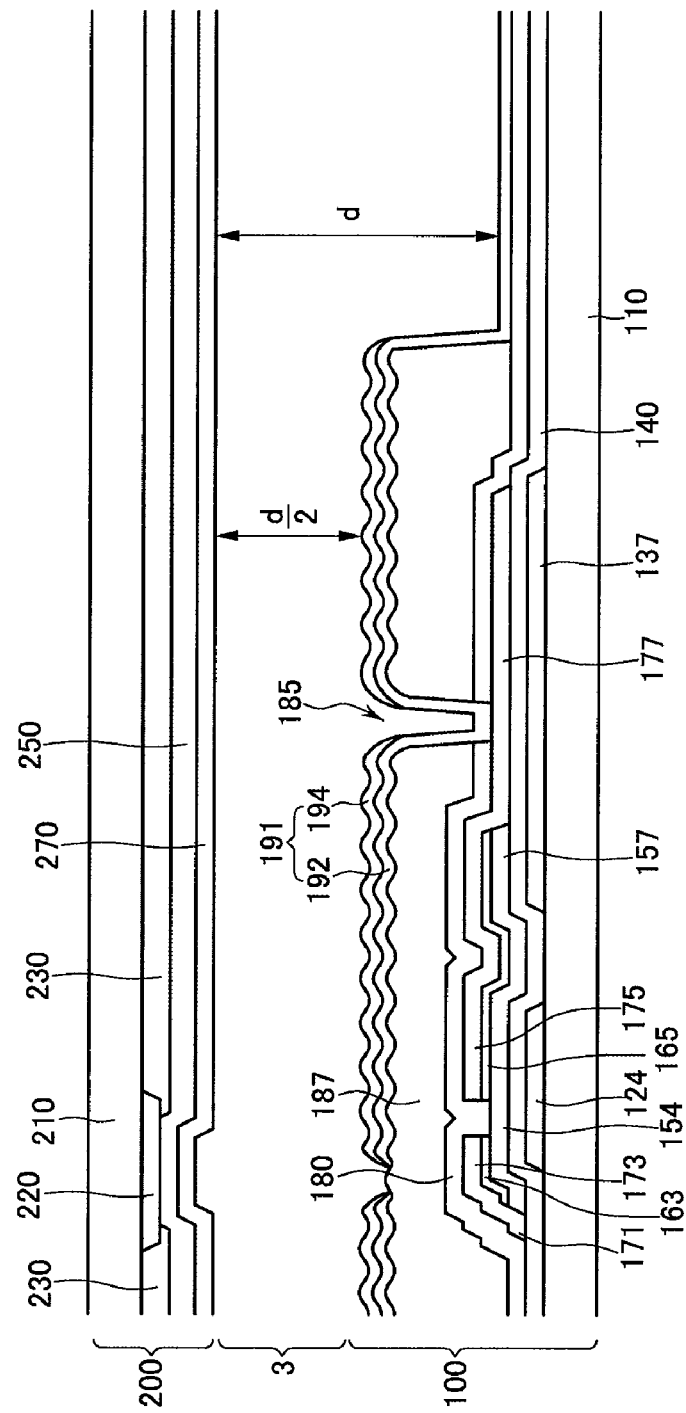
FIG. 10 and FIG. 11 are sectional views of the liquid crystal display shown in FIG. 9 taken along the lines X-X and XI-XI, respectively.
Figure 11:
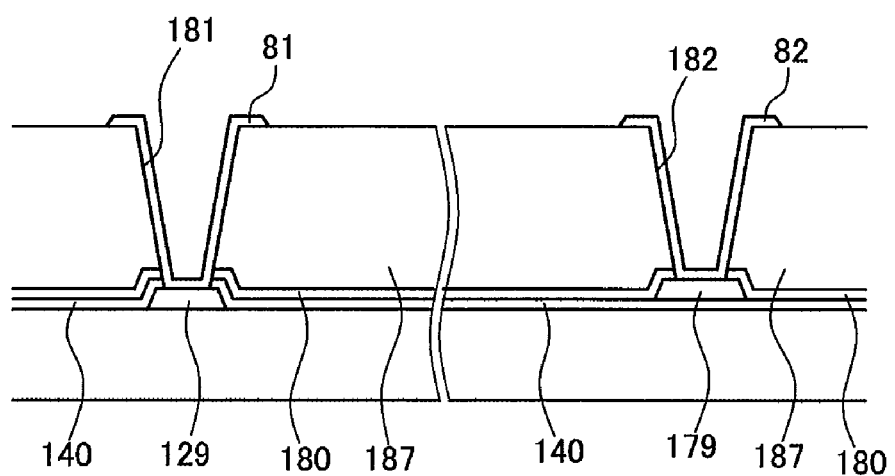
Figure 12:
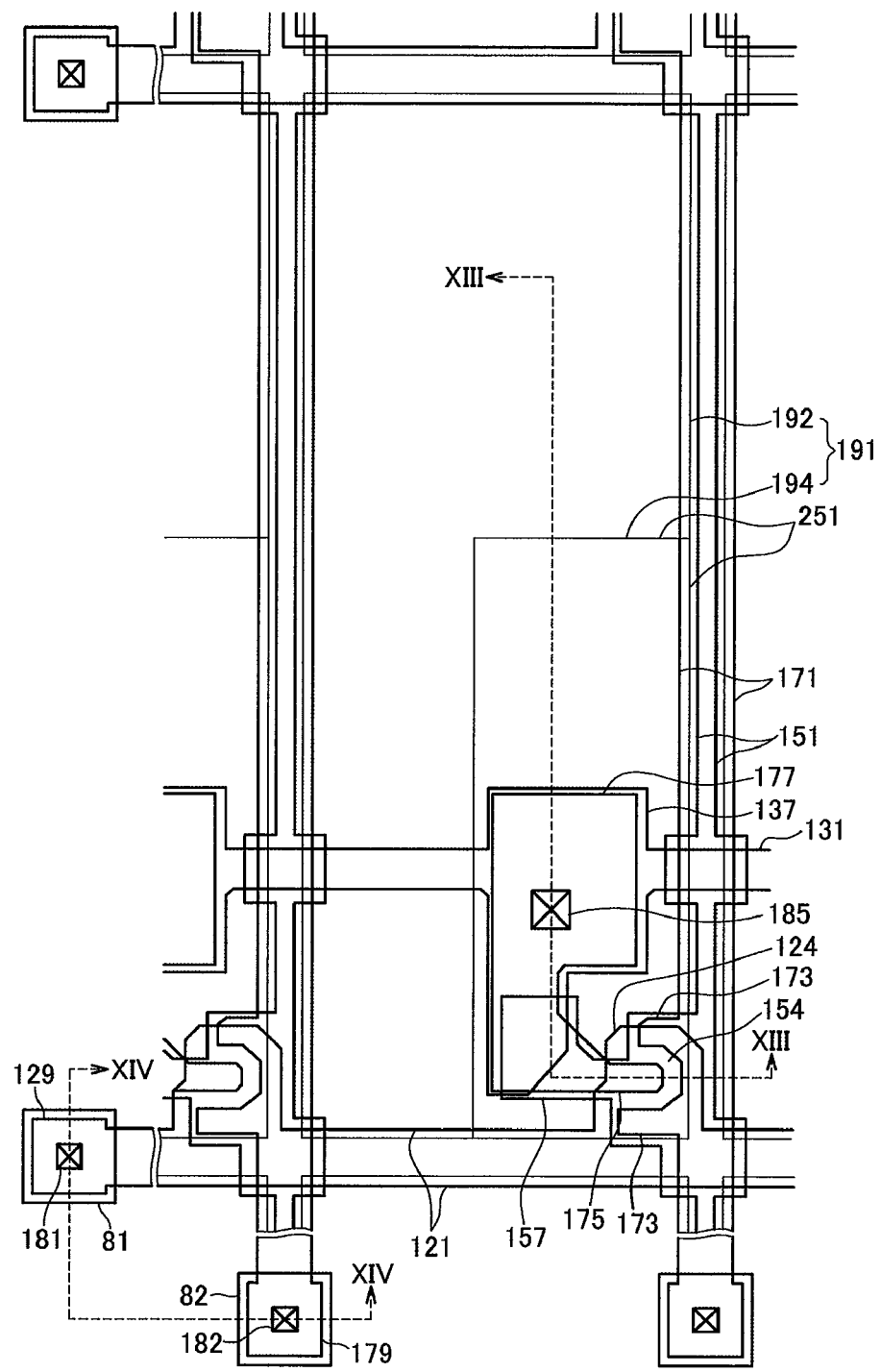
FIG. 12 is a layout view of a liquid crystal display according to another embodiment of the present invention.
Figure 13:
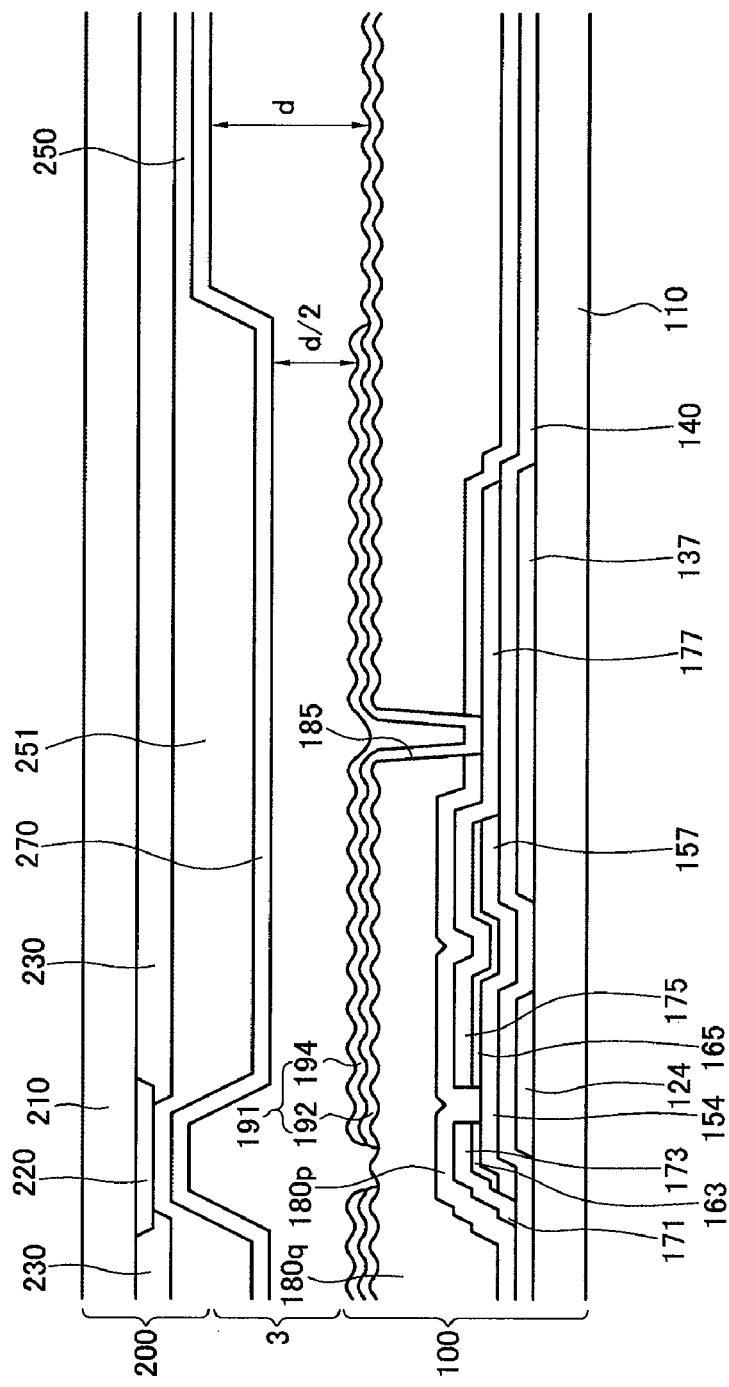
FIG. 13 and FIG. 14 are sectional views of the liquid crystal display shown in FIG. 12 taken along the lines XIII-XIII and XIV-XIV, respectively.
Figure 14:
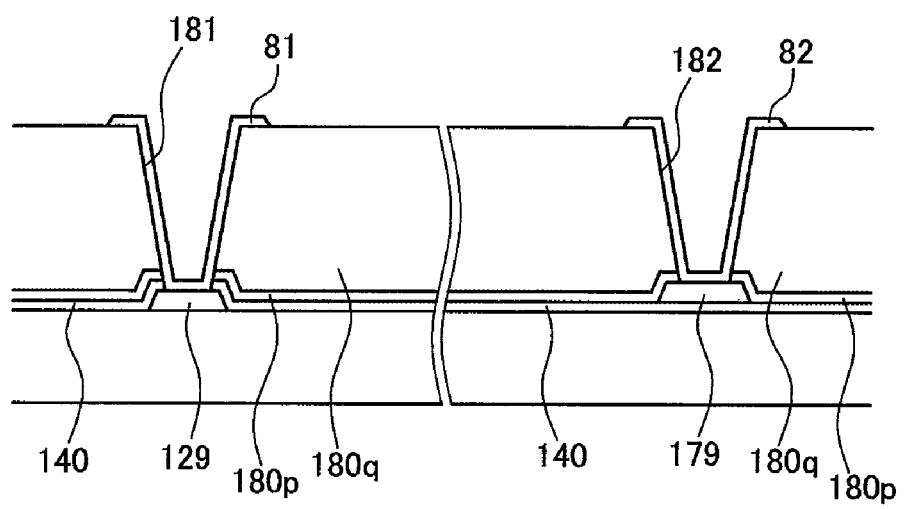

FIG. 9 is a layout view of a liquid crystal display according to another embodiment of the present invention and FIG. 10 and FIG. 11 are sectional views of the liquid crystal display shown in FIG. 9 taken along the lines X-X and XI-XI, respectively. FIG. 12 is a layout view of a liquid crystal display according to another embodiment of the present invention, and FIG. 13 and FIG. 14 are sectional views of the liquid crystal display shown in FIG. 12 taken along the lines XIII-XIII and XIV-XIV, respectively.

As shown in FIG. 9 to FIG. 11, a layered structure of a liquid crystal display according to the present embodiment is substantially the same as that described above.

The liquid crystal display according to the embodiment includes a thin film transistor array panel 100, a common electrode panel 200 facing the thin film transistor array panel 100, and a liquid crystal layer 3 interposed therebetween.

Firstly, in a thin film transistor array panel 100, a plurality of gate lines 121 including a plurality of gate electrode 124 and end portions 129, and a plurality of storage electrode lines 131 including a plurality of storage electrodes 137 are formed on a substrate 110. A gate insulating layer 140, a plurality of semiconductor stripes 151 including projections 154, a plurality of ohmic contact stripes 161 including projections 163, and a plurality of ohmic contact islands 165 are sequentially formed on the gate lines 121 and the storage electrode lines 131.

A plurality of data lines 171 including source electrodes 173 and end portions 179, and a plurality of drain electrode 175 including a plurality of projections 177 are formed on the ohmic contacts 161 and 165, and a passivation layer 180 is formed thereon. A plurality of organic insulator patterns 187 are formed on portions of the passivation layer 180. The organic insulators 187 have an embossed surface.

A plurality of pixel electrodes 191 are formed on the passivation layer 180 and the organic insulator patterns 187. Each pixel electrode 191 includes a transmissive electrode 192 and a reflective electrode 194. The reflective electrode 194 is formed on a portion of the transmissive electrode 192 and disposed on the organic insulator pattern 187. The pixel electrode 191 is curved along the embossed surface of the organic insulator 187.

Next, in a common electrode panel 200, a plurality of light blocking members 220, a plurality of color filters 230, an overcoat 250, and a common electrode 270 are sequentially formed on a substrate 210.

However, unlike the liquid crystal display shown in FIG. 1 to FIG. 3 or FIG. 4 to FIG. 6, the organic insulator patterns 187 for adjusting cell gaps of the liquid crystal display in transmissive regions TA and the reflective regions RA have a rectangular planar shape having two sides shorter than that of the pixel electrodes 191. The organic insulator patterns 187 are disposed at areas corresponding to the reflective electrodes 194 of the thin film transistor array panel 100. Accordingly, the cell gap d in transmissive regions TA is about twice as large as the cell gap d/2 in the reflective regions RA.

In addition, the area of the reflective regions RA including the organic insulator patterns 187 may be more than about 50% of that of the pixel electrodes 191 such that the reflective regions RA disposed under or above the organic insulator patterns 187 have larger areas than the transmissive regions TA.

Next, in the liquid crystal display shown in FIG. 12 to FIG. 14, a layered structure of a liquid crystal display according to the present embodiment is substantially the same as that shown in FIG. 9 to FIG. 11 described above.

In a thin film transistor array panel 100, a plurality of gate lines 121 including a plurality of gate electrode 124 and end portions 129, and a plurality of storage electrode lines 131 including a plurality of storage electrodes 137 are formed on a substrate 110, and a gate insulating layer 140, a plurality of semiconductor stripes 151 including projections 154, a plurality of ohmic contact stripes 161 including projections 163, and a plurality of ohmic contact islands 165 are sequentially formed on the gate lines 121 and the storage electrode lines 131. A plurality of data lines 171 including source electrodes 173 and end portions 179, and a plurality of drain electrode 175 including a plurality of projections 177 are formed on the ohmic contacts 161 and 165, and a passivation layer 180 is formed thereon. The passivation layer 180 includes a lower passivation film 180p preferably made of an inorganic insulator and an upper passivation film 180q preferably made of an organic insulator. The upper passivation film 180q has an embossed surface. The passivation layer 180 has a plurality of contact holes 181, 182, and 185, and the passivation layer 180 and the gate insulating layer 140 have a plurality of contact holes 181.

A plurality of pixel electrodes 191 are formed on the upper passivation layer 180q. Each pixel electrode 191 includes a transmissive electrode 192 and a reflective electrode 194. The reflective electrode 194 is formed on a portion of the transmissive electrode 192. The pixel electrode 191 is curved along the embossed surface of the upper passivation film 180q.

In a common electrode panel 200, a plurality of light blocking members 220, a plurality of color filters 230, an overcoat 250, and a common electrode 270 are sequentially formed on a substrate 210. The overcoat 250 includes a plurality of organic insulator patterns 251.

However, unlike the liquid crystal display shown in FIG. 9 to FIG. 11, the organic insulator patterns 251 for adjusting cell gaps of the liquid crystal display in transmissive regions TA and the reflective regions RA are formed on the common electrode panel 200. In addition, the thin film transistor array panel 100 according to the embodiment does not include the organic insulator patterns 187 shown in FIG. 9 to FIG. 11.

The organic insulator patterns 251 are formed in regions corresponding to the reflective electrodes 194 of the thin film transistor array panel 100, and thereby the cell gap d in transmissive regions TA is twice as large as the cell gap d/2 in the reflective regions RA.

The area of the reflective regions RA including the organic insulator patterns 251 may be more than about 50% of that of the pixel electrodes 191 such that the reflective regions RA disposed under or above the organic insulator patterns 251 have a larger area than the transmissive regions TA as with the liquid crystal display shown in FIG. 9 to FIG. 11. In addition, the organic insulator patterns 251 have the same planar shape as the organic insulator pattern 187 shown in FIG. 9 to FIG. 11.

Now, the organic insulator patterns 187 and 251 of the liquid crystal display according to the above embodiments will be described in more detail with reference to FIG. 15A and FIG. 15B.

Figure 15A:
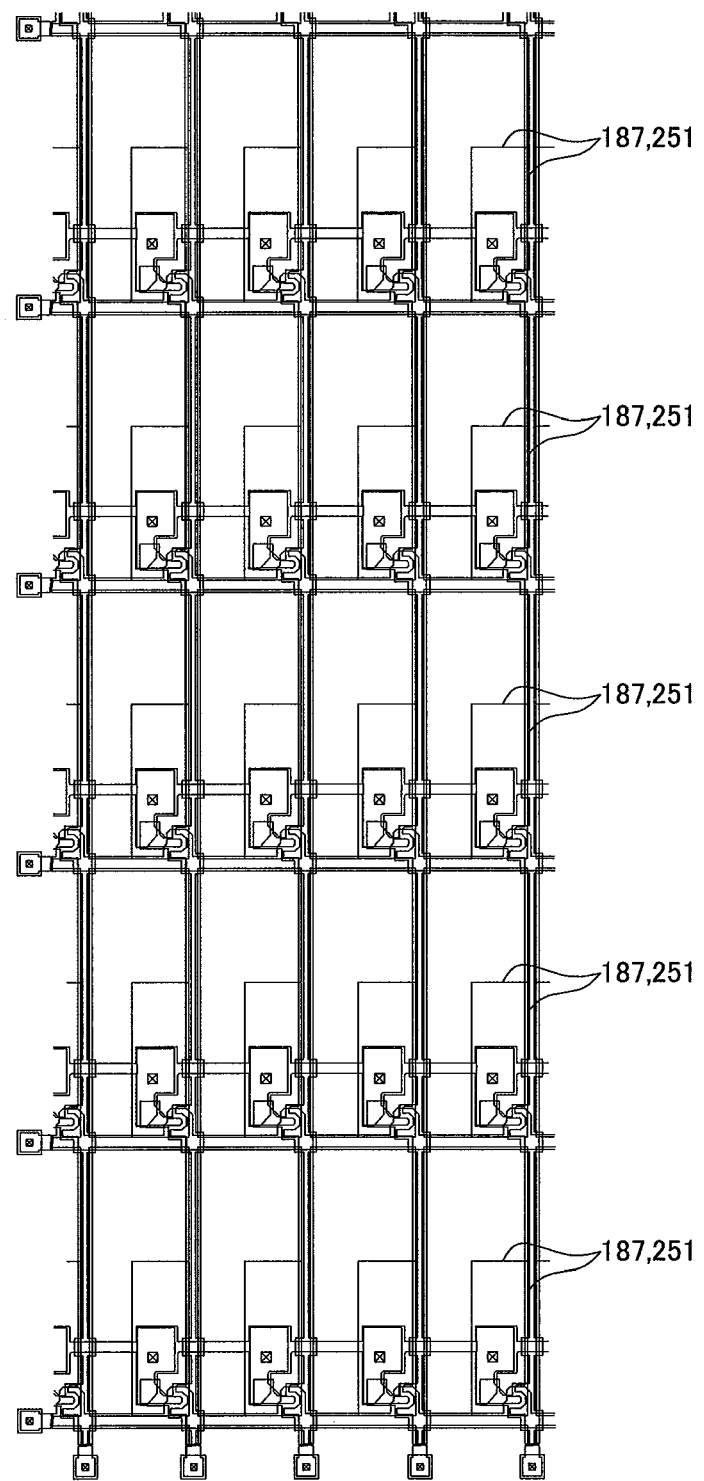
FIG. 15A and FIG. 15B are a layout view representing a plurality of pixels of the liquid crystal display shown in FIG. 9 to FIG. 11 or FIG. 12 to FIG. 14.
Figure 15B:
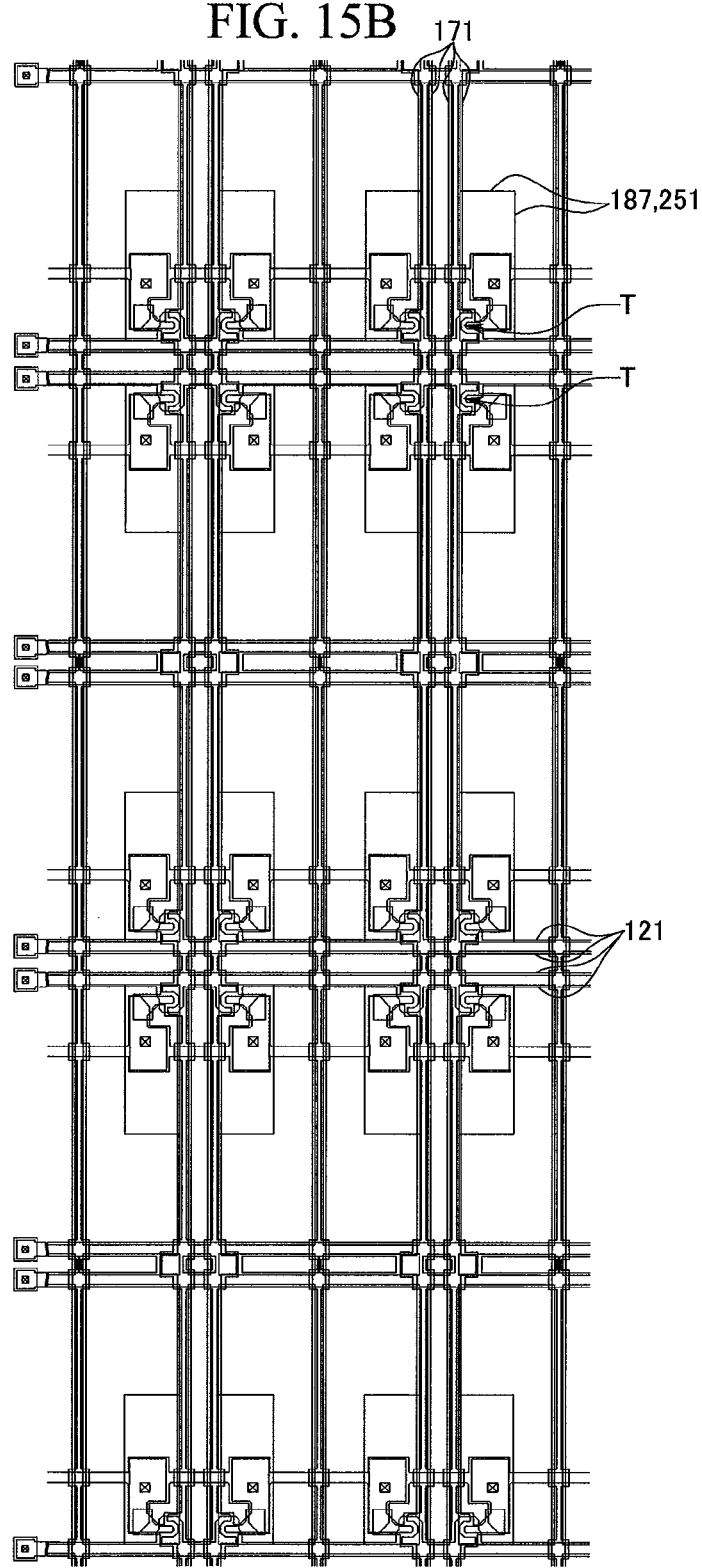

FIG. 15A and FIG. 15B are a layout view representing a plurality of pixels of the liquid crystal display shown in FIG. 9 to FIG. 11 or FIG. 12 to FIG. 14.

Referring to FIG. 15A, the liquid crystal display according to the embodiments of the present invention includes a plurality of pixels, and the organic insulator patterns 187 or 251 of the pixels are formed adjacent to one of two longer sides of the pixel electrodes and have a rectangular planar shape having one short side shorter than one of two shorter sides of the pixel electrodes. In addition, the organic insulator patterns 187 or 251 are periodically disposed in the same position per every pixel in a row direction. As described above, in the liquid crystal display according to the present embodiments, the reflective regions RA disposed under or above the organic insulator patterns 187 or 251 have larger area than the transmissive regions TA.

In the liquid crystal display according to the embodiments of the present invention, the organic insulator patterns 187 or 251 are periodically disposed in the same position per every pixel in a row direction and the area of regions including the organic insulator patterns 187 or 251 is larger than that of regions not including the organic insulator patterns 187 or 251. However, as shown in FIG. 15A, the organic insulator patterns 187 and 251 have a rectangular planar shape having two sides respectively shorter than two sides of the pixel electrodes 191 such that liquid crystals 30 dripped in a manufacturing method of the liquid crystal display may be simultaneously move in a column direction and in a row direction.

Next, referring to FIG. 15B, the liquid crystal display according to the embodiment includes a plurality of gate lines 121 extending in a row direction, and a plurality of data lines 171 extending in a column direction, every two gate lines 121 are disposed adjacent to each other, and every two data lines 171 is disposed adjacent to each other. The deposition of the gate lines 121 and the data lines 171 is repeated in a row direction and column direction.

The liquid crystal display includes a plurality of pixels and each pixel includes an organic insulator pattern 187 or 251, and four organic insulator patterns 187 and 251 including two of a row direction and two of a column direction are disposed adjacent to one another. The deposition is repeated every four pixels.

In addition, the thin film transistors T of the pixels including gate electrodes 124 extended from the gate lines 121 and source electrodes 173 extended from the data lines 171 are disposed under the organic insulator patterns 187 and 251 such that the thin film transistors T of every four pixels are disposed adjacent to one another.

As described above, the area of regions including the organic insulator patterns 187 or 251 is larger than that of regions not including the organic insulator patterns 187 or 251.

However, as shown in FIG. 15B, the organic insulator patterns 187 and 251 have a rectangular planar shape having two sides respectively shorter than two sides of the pixel electrodes 191, and four organic insulator patterns 187 or 251 of four pixels are disposed adjacent to one another such that liquid crystals 30 dripped in a manufacturing method of the liquid crystal display may be rapidly move in a column direction and in a row direction simultaneously.

Accordingly, although the reflective regions RA including the organic insulator patterns 187 or 251 have a larger area than the transmissive regions TA not including the organic insulator patterns 187 or 251 and the height difference occurred by the organic insulator patterns 187 or 251 exists, the dripped liquid crystal 30 may easily move to be dispersed rapidly and uniformly.

Now, a liquid crystal display according to another embodiment of the present invention will be described with reference to FIG. 16 to FIG. 18 and FIG. 19 to FIG. 21.

Figure 16:
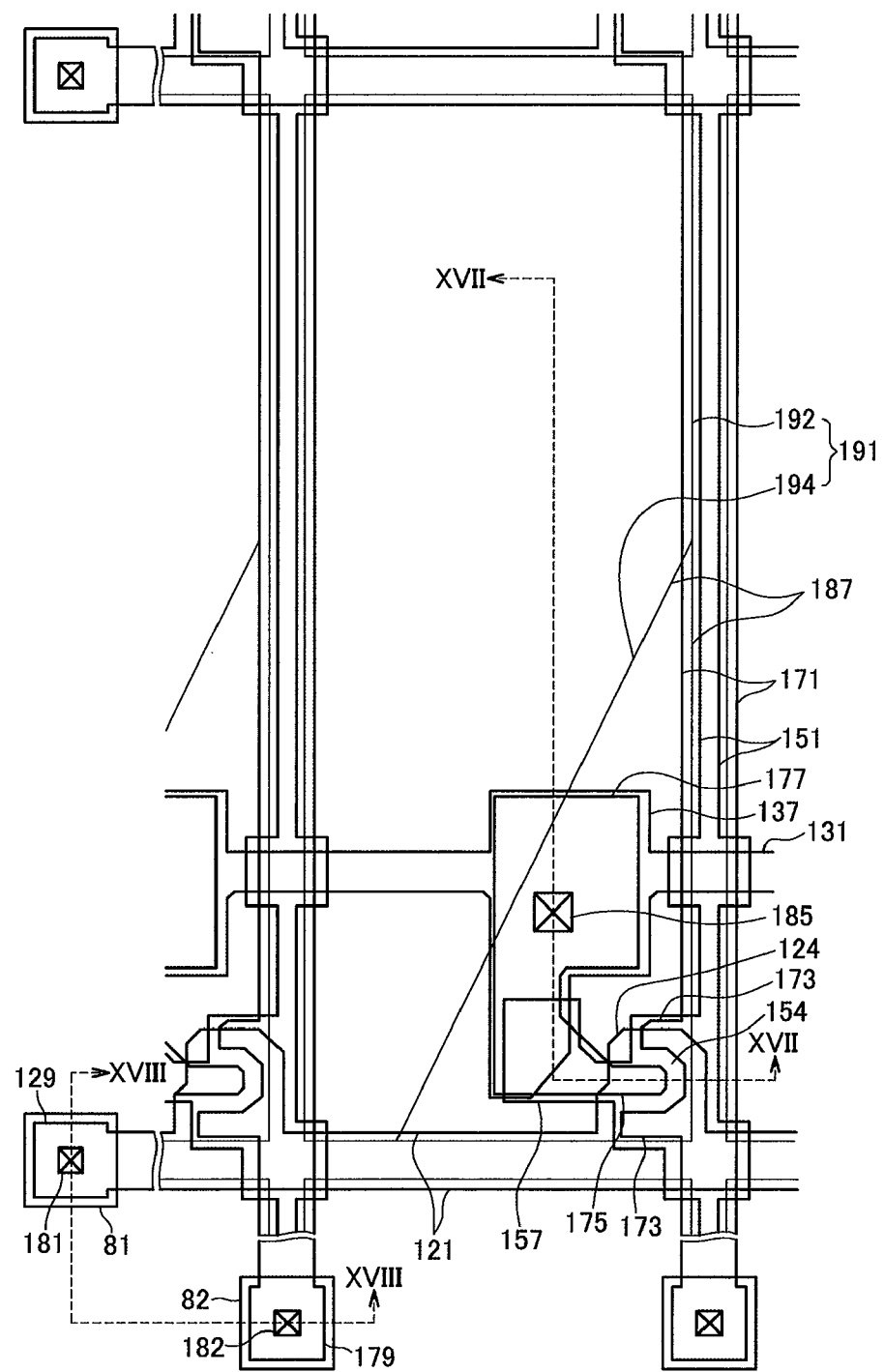
FIG. 16 is a layout view of a liquid crystal display according to another embodiment of the present invention.
Figure 17:
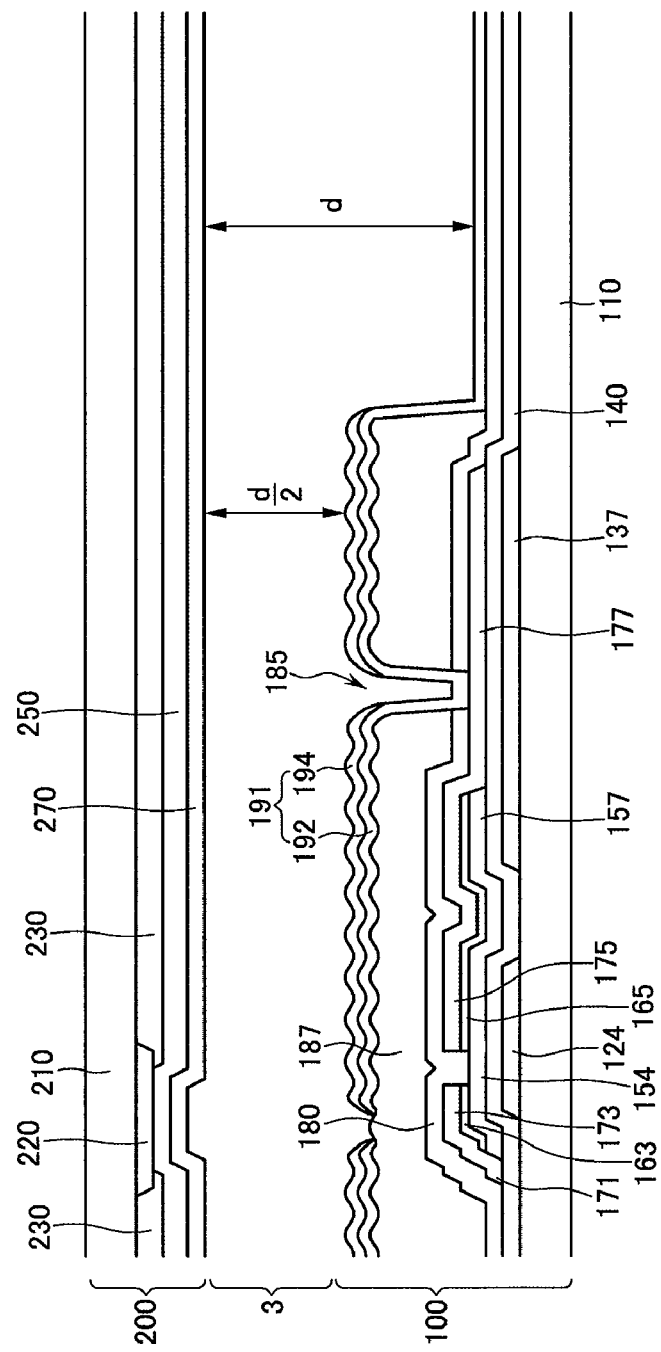
FIG. 17 and FIG. 18 are sectional views of the liquid crystal display shown in FIG. 16 taken along the lines XVII-XVII and XVIII-XVIII, respectively.
Figure 18:
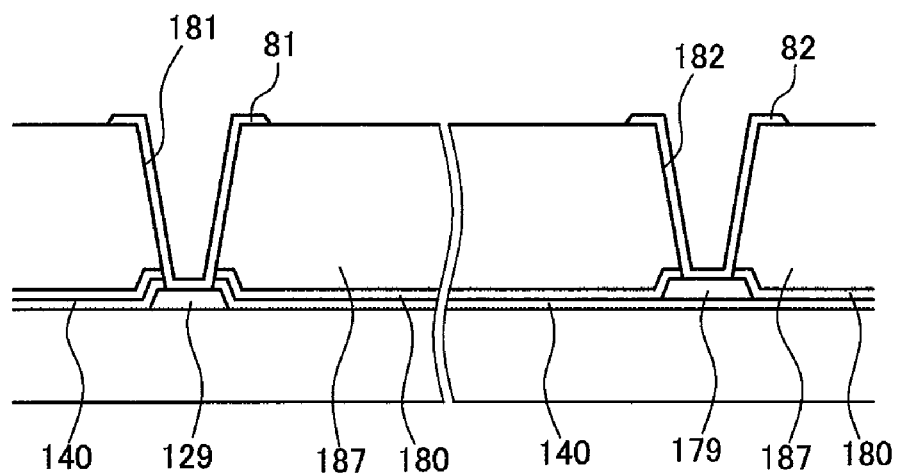
Figure 19:
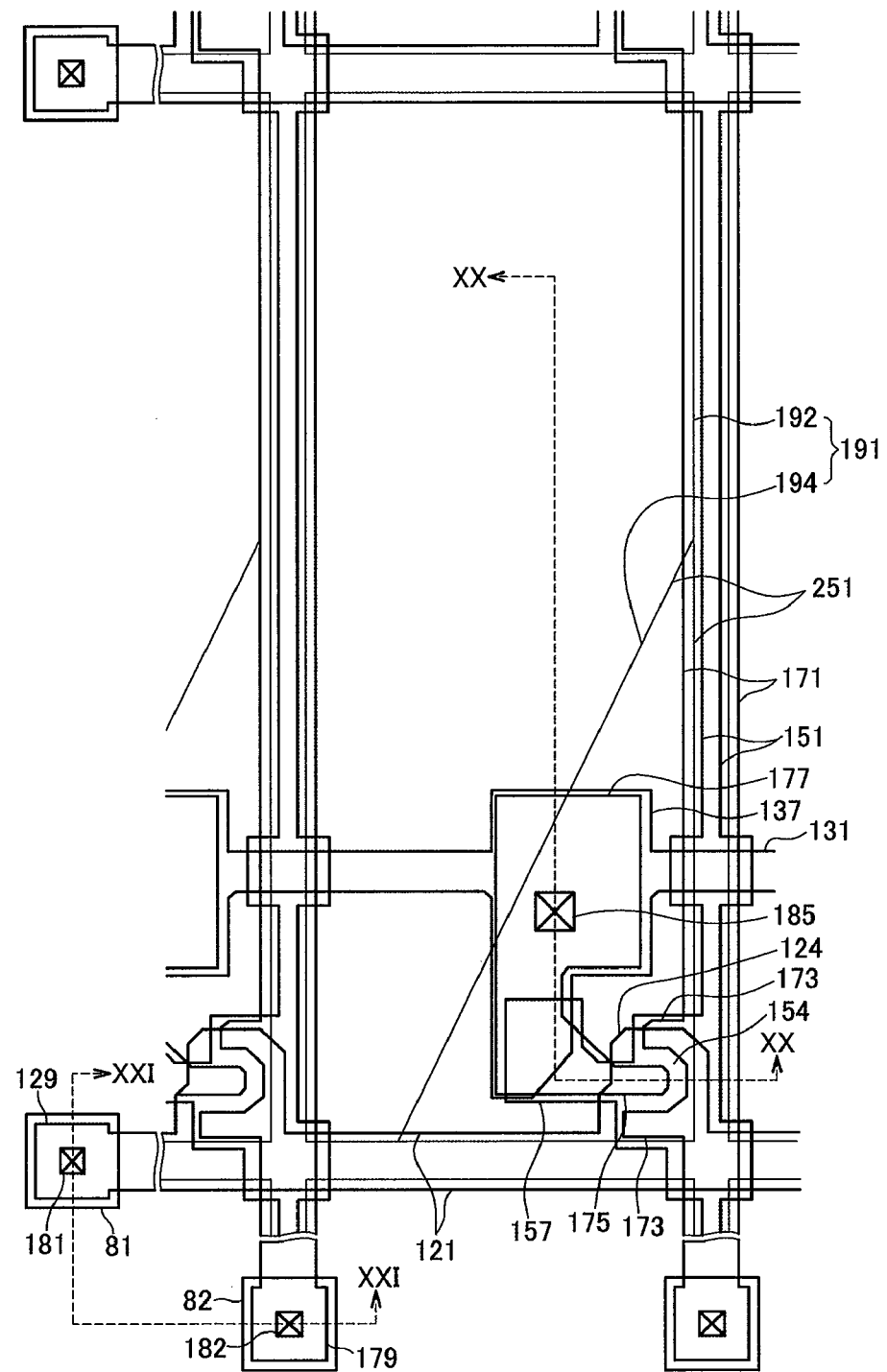
FIG. 19 is a layout view of a liquid crystal display according to another embodiment of the present invention.
Figure 20:
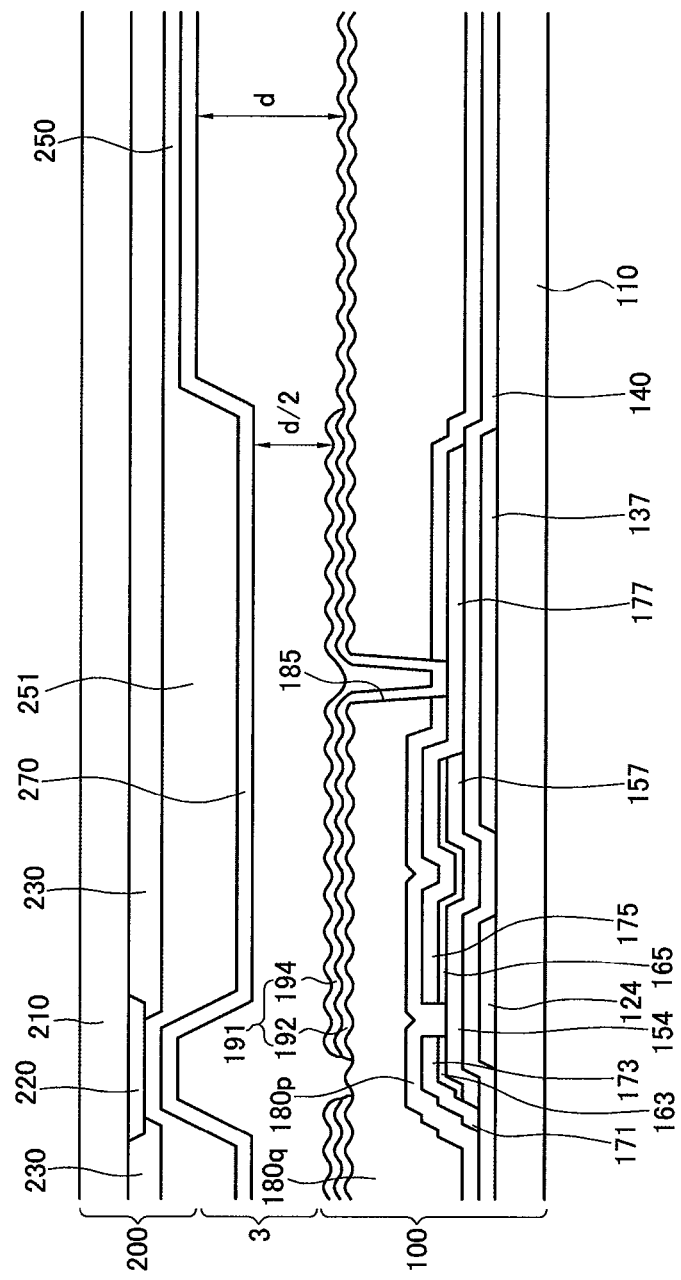
FIG. 20 and FIG. 21 are sectional views of the liquid crystal display shown in FIG. 19 taken along the lines XX-XX and XXI-XXI.
Figure 21:
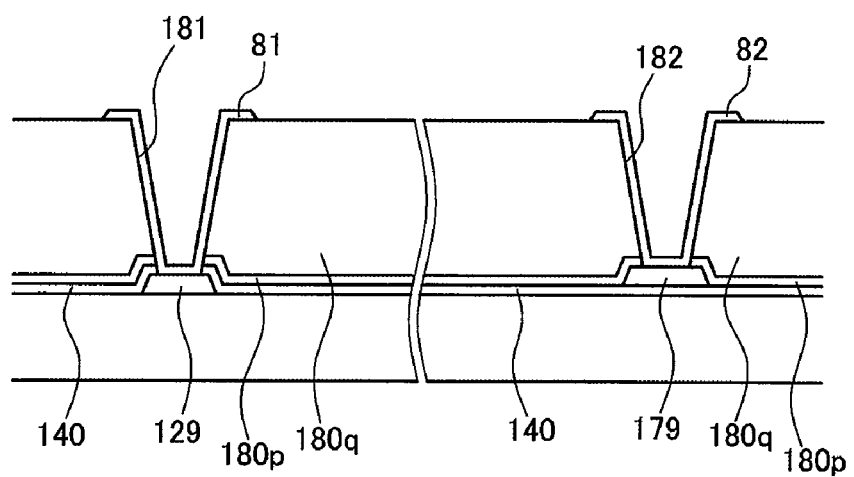

FIG. 16 is a layout view of a liquid crystal display according to another embodiment of the present invention, and FIG. 17 and FIG. 18 are sectional views of the liquid crystal display shown in FIG. 16 taken along the lines XVII-XVII and XVIII-XVIII, respectively. FIG. 19 is a layout view of a liquid crystal display according to another embodiment of the present invention, and FIG. 20 and FIG. 21 are sectional views of the liquid crystal display shown in FIG. 19 taken along the lines XX-XX and XXI-XXI.

Firstly, in a liquid crystal display shown in FIG. 16 to FIG. 18, a layered structure of the liquid crystal display according to the present embodiment is substantially the same as that shown in FIG. 9 to FIG. 11.

The liquid crystal display according to the embodiment includes a thin film transistor array panel 100, a common electrode panel 200 facing the thin film transistor array panel 100, and a liquid crystal layer 3 interposed therebetween.

Firstly, in a thin film transistor array panel 100, a plurality of gate lines 121 including a plurality of gate electrodes 124 and end portions 129, and a plurality of storage electrode lines 131 including a plurality of storage electrodes 137 are formed on a substrate 110. A gate insulating layer 140, a plurality of semiconductor stripes 151 including projections 154, a plurality of ohmic contact stripes 161 including projections 163, and a plurality of ohmic contact islands 165 are sequentially formed on the gate lines 121 and the storage electrode lines 131.

A plurality of data lines 171 including source electrodes 173 and end portions 179, and a plurality of drain electrodes 175 including a plurality of projections 177 are formed on the ohmic contacts 161 and 165, and a passivation layer 180 is formed thereon. A plurality of organic insulator patterns 187 are formed on portions of the passivation layer 180. The organic insulators 187 have an embossed surface.

A plurality of pixel electrodes 191 are formed on the passivation layer 180 and the organic insulator patterns 187. Each pixel electrode 191 includes a transmissive electrode 192 and a reflective electrode 194. The reflective electrode 194 is formed on a portion of the transmissive electrode 192 and disposed on the organic insulator pattern 187. The pixel electrode 191 is curved along the embossed surface of the organic insulator 187.

Next, in a common electrode panel 200, a plurality of light blocking members 220, a plurality of color filters 230, an overcoat 250, and a common electrode 270 are sequentially formed on a substrate 210.

However, unlike the liquid crystal display shown in FIG. 9 to FIG. 11, the organic insulator patterns 187 for adjusting cell gaps of the liquid crystal display in transmissive regions TA and the reflective regions RA have a planar shape of a right triangle having one long side shorter than the longer side of the pixel electrode and one short side shorter than the short side of the pixel electrode.

The area of the reflective regions RA including the organic insulator patterns 187 and 251 may be more than about 50% of that of the pixel electrodes 191 such that the reflective regions RA disposed under or above the organic insulator patterns 187 have larger area than the transmissive regions TA as like as the liquid crystal display shown in FIG. 9 to FIG. 11.

Next, referring to FIG. 19 to FIG. 21, a layered structure of a liquid crystal display according to the present embodiment is substantially the same as that shown in FIG. 12 to FIG. 14.

In a thin film transistor array panel 100, a plurality of gate lines 121 including a plurality of gate electrode 124 and end portions 129, and a plurality of storage electrode lines 131 including a plurality of storage electrodes 137 are formed on a substrate 110, and a gate insulating layer 140, a plurality of semiconductor stripes 151 including projections 154, a plurality of ohmic contact stripes 161 including projections 163, and a plurality of ohmic contact islands 165 are sequentially formed on the gate lines 121 and the storage electrode lines 131. A plurality of data lines 171 including source electrodes 173 and end portions 179, and a plurality of drain electrode 175 including a plurality of projections 177 are formed on the ohmic contacts 161 and 165, and a passivation layer 180 is formed thereon. The passivation layer 180 includes a lower passivation film 180$p$ preferably made of an inorganic insulator and an upper passivation film 180$q$ preferably made of an organic insulator. The upper passivation film 180$q$ has an embossed surface. The passivation layer 180 has a plurality of contact holes 181, 182, and 185, and the passivation layer 180 and the gate insulating layer 140 have a plurality of contact holes 181.

A plurality of pixel electrodes 191 are formed on the upper passivation layer 180$q$. Each pixel electrode 191 includes a transmissive electrode 192 and a reflective electrode 194. The reflective electrode 194 is formed on a portion of the transmissive electrode 192. The pixel electrode 191 is curved along the embossed surface of the upper passivation film 180$q$.

In a common electrode panel 200, a plurality of light blocking members 220, a plurality of color filters 230, an overcoat 250, and a common electrode 270 are sequentially formed on a substrate 210. The overcoat 250 includes a plurality of organic insulator patterns 251.

However, unlike the liquid crystal display shown in FIG. 16 to FIG. 18, the organic insulator patterns 251 for adjusting cell gaps of the liquid crystal display in transmissive regions TA and the reflective regions RA are formed on the common electrode panel 200. The organic insulator patterns 251 have the same planar shape as the organic insulator patterns 187 shown in FIG. 16 to FIG. 18. In addition, the thin film transistor array panel 100 according to the embodiment does not include the organic insulator patterns 187 shown in FIG. 16 to FIG. 18.

The area of the reflective regions RA including the organic insulator patterns 251 may be more than about 50% of that of the pixel electrodes 191 such that the reflective regions TA disposed under or above the organic insulator patterns 251 have larger area than the transmissive regions TA as with as the liquid crystal display shown in FIG. 16 to FIG. 18.

Now, the organic insulator patterns 187 and 251 of the liquid crystal display according to the above embodiments will be described in more detail with reference to FIG. 22.

Figure 22:
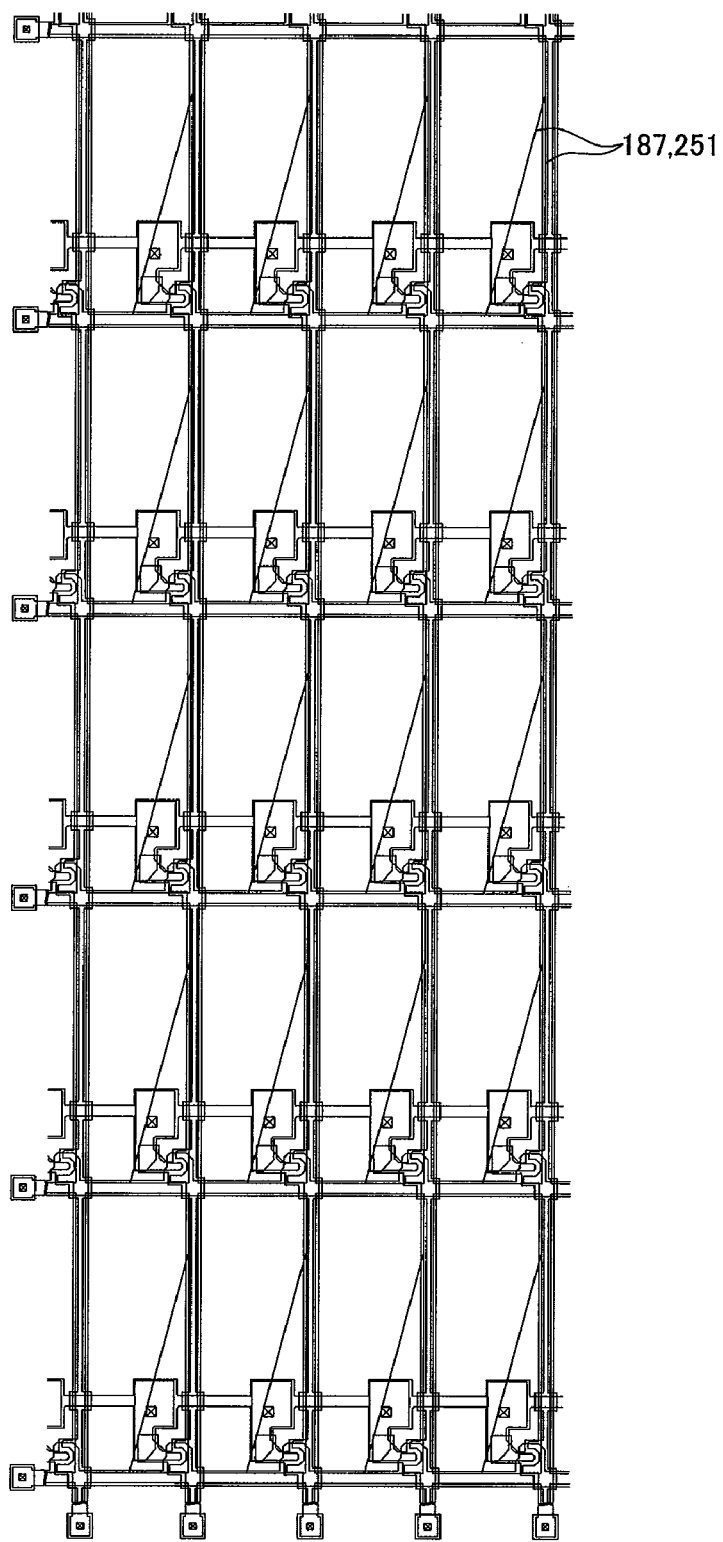
FIG. 22 is a layout view representing a plurality of pixels of the liquid crystal display shown in FIG. 16 to FIG. 18 or FIG. 19 to FIG. 21.

FIG. 22 is a layout view representing a plurality of pixels of the liquid crystal display shown in FIG. 16 to FIG. 18 or FIG. 19 to FIG. 21.

Referring to FIG. 22, the liquid crystal display according to the embodiments of the present invention includes a plurality of pixels, and the organic insulator patterns 187 or 251 of the pixels have a planar shape of a right triangle having one long side shorter than the longer side of the pixel electrode and one short side shorter than the short side of the pixel electrode.

Additionally, the organic insulator patterns 187 or 251 are periodically disposed in the same position per every pixel in a row direction. As described above, in the liquid crystal display according to the present embodiments, the reflective regions RA disposed under or above the organic insulator patterns 187 or 251 have larger area than the transmissive regions TA not including the organic insulator patterns 187 or 251.

In the liquid crystal display according to the embodiments of the present invention, the organic insulator patterns 187 or 251 are periodically disposed in the same position per every pixel in a row direction and the area of regions including the organic insulator patterns 187 or 251 is larger than that of regions not including the organic insulator patterns 187 or 251. However, as shown in FIG. 22, the organic insulator patterns 187 and 251 have a planar shape of a right triangle having one long side shorter than the longer side of the pixel electrode and one short side shorter than the short side of the pixel electrode.

Accordingly, although the reflective regions RA including the organic insulator patterns 187 or 251 have a larger area than the transmissive regions TA not including the organic insulator patterns 187 or 251 and the height difference occurred by the organic insulator patterns 187 or 251 exists, the dripped liquid crystal 30 may easily move to be dispersed rapidly and uniformly.

Although the liquid crystal display according to the embodiments of the invention includes the organic insulator patterns 187 or 251 having a planar shape of a rectangle or a right triangle, the organic insulator patterns 187 and 251 may have a planar shape of a polygon having a shorter side than the pixel electrode.

According to embodiments of the present invention, the planar shape of the organic insulator patterns 187 and 251 for adjusting cell gaps of the liquid crystal display in transmissive regions TA and the reflective regions RA may be adjusted such that the liquid crystals formed using drop injection may be dispersed rapidly and uniformly to maintain a uniform cell gap and prevent a stain of the display.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a plurality of pixel electrodes formed on the first substrate and including a plurality of transparent electrodes and a plurality of reflective electrodes formed on portions of the transparent electrodes;
a second substrate facing the first substrate; and a liquid crystal layer interposed between the first substrate and the second substrate; and electrodes, wherein a plurality of organic insulator patterns are disposed in regions corresponding to only the reflective electrodes, and the organic insulator patterns are disposed adjacent to each other per two pixel electrodes in a column direction and the deposition is periodically repeated per every two pixel electrodes;
a plurality of gate lines extending in a row direction and including a plurality of gate electrodes;
a plurality of data lines extending in a column direction and including a plurality of source electrodes; and
a plurality of thin film transistors including the gate electrodes, drain electrodes electrically connected to the pixel electrodes, and the source electrodes,
wherein eveec-two gate lines and eve ~two thin film transistors are disposed adjacent to each other in a column direction, respectively, and the deposition is periodically repeated in a column direction, and
wherein every four thin film transistors, including two of a row direction and two of a column direction, are disposed adjacent to one another, and
two t-he thin film transistors of the four thin film transistors are connected to different gate lines of the two adjacent gate lines and disposed under the organic insulator patterns.

2. The liquid crystal display of claim 1, wherein the liquid crystal layer is formed using a drop injection.

3. The liquid crystal display of claim 2, wherein the organic insulator patterns have a square planar shape including one side having the same length as one short side of the pixel electrode.

4. The liquid crystal display of claim 3, wherein the thickness of regions including the transparent electrode and the reflective electrode is about half as large as that of regions including the transparent electrode.

5. The liquid crystal display of claim 4, wherein the organic insulator patterns are disposed on the first substrate, and the organic insulator patterns are formed between the first substrate and the pixel electrodes.

6. The liquid crystal display of claim 5, wherein the organic insulator patterns have an embossed surface, and the pixel electrodes are curved along the embossed surface of the organic insulator pattern.

7. The liquid crystal display of claim 4, wherein the organic insulator patterns are formed on the second substrate.

8. The liquid crystal display of claim 1, wherein the area of the reflective electrodes is under about 50% of that of the transparent electrode.

9. The liquid crystal display of claim 1, wherein the organic insulator patters are formed in regions corresponding to the transparent electrodes.

10. A liquid crystal display, comprising:
a first substrate;
a plurality of pixel electrodes formed on the first substrate and including a plurality of transparent electrodes and a plurality of reflective electrodes formed on portions of the transparent electrodes;
a second substrate facing the first substrate; and
a liquid crystal layer interposed between the first substrate and the second substrate; and electrodes, wherein a plurality of organic insulator patterns are disposed in regions corresponding to only the reflective electrodes, and the organic insulator patterns have a planar shape having two sides respectively shorter than two sides of the pixel electrodes;
a plurality of gate lines extending in a row direction and including a plurality of gate electrodes; a plurality of data lines extending in a column direction and including a plurality of source electrodes; and a plurality of thin film transistors including the gate electrodes, drain electrodes electrically connected to the pixel electrodes, and the source electrodes, wherein every two gate lines are disposed adjacent to each other in a column direction, every two data lines are disposed adjacent to each other in a row direction, and every four of the thin film transistors including two of a row direction and two of a column direction are disposed adjacent to one another, and two ttae thin film transistors adjacent to each other in a column direction are connected to different gate lines of the two adjacent gate lines and the thin film transistors are disposed under the organic insulator patterns. patterns are formed in regions corresponding to the transparent electrodes.

11. The liquid crystal display of claim 10, wherein the liquid crystal layer is formed using a drop injection.

12. The liquid crystal display of claim 10, wherein the thickness of regions including the transparent electrode and the reflective electrode is about half as large as that of regions including the transparent electrode.

13. The liquid crystal display of claim 10, wherein the organic insulator patterns have a planar shape of a polygon having a shorter side than one side of the pixel electrode.

14. The liquid crystal display of claim 13, wherein the organic insulator patterns have a planar shape of a rectangle or a right triangle.

15. The liquid crystal display of claim 13, wherein the organic insulator patterns are disposed on the first substrate, and the pixel electrodes are formed on the first substrate and the organic insulator patterns.

16. The liquid crystal display of claim 13, wherein the organic insulator patterns have an embossed surface, and the pixel electrodes are curved along the embossed surface of the organic insulator pattern.

17. The liquid crystal display of claim 13, wherein the organic insulator patterns are formed on the second substrate.

18. The liquid crystal display of claim 10, wherein the area of the reflective electrodes is greater than about 50% of that of the transparent electrode.

19. The liquid crystal display of claim 10, wherein the organic insulator patterns are periodically disposed in the same position per every pixel in a column direction.

20. The liquid crystal display of claim 10, wherein the organic insulator patterns are formed in regions corresponding to the transparent electrodes.

* * * * *